United States Patent
Huang et al.

(10) Patent No.: US 12,133,228 B2
(45) Date of Patent: Oct. 29, 2024

(54) TWO-STAGE FEEDBACK PROCEDURES FOR MULTIPLE DOWNLINK TRANSMISSIONS

(71) Applicant: QUALCOMM Incorporated, San Diego, CA (US)

(72) Inventors: Yi Huang, San Diego, CA (US); Seyedkianoush Hosseini, San Diego, CA (US); Wanshi Chen, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 17/143,650

(22) Filed: Jan. 7, 2021

(65) Prior Publication Data
US 2021/0298062 A1    Sep. 23, 2021

Related U.S. Application Data

(60) Provisional application No. 62/993,455, filed on Mar. 23, 2020.

(51) Int. Cl.
*H04W 72/23* (2023.01)
*H04W 72/20* (2023.01)

(52) U.S. Cl.
CPC .......... *H04W 72/23* (2023.01); *H04W 72/20* (2023.01)

(58) Field of Classification Search
CPC ............. H04W 72/14; H04W 72/1278; H04W 72/1289; H04W 72/23; H04W 72/20;
(Continued)

(56) References Cited

U.S. PATENT DOCUMENTS 10,812,161 B2 * 10/2020 Mueck ................ H04B 7/0623
10,887,941 B2    1/2021 Yoo et al.
(Continued)

FOREIGN PATENT DOCUMENTS

WO    2018034788    2/2018

OTHER PUBLICATIONS

5G NR Quasi-Colocation Concept, Types and Application, Techplayon, www.techplayon.com (Year: 2019).*
(Continued)

*Primary Examiner* — Yu-Wen Chang
(74) *Attorney, Agent, or Firm* — Holland & Hart LLP

(57) ABSTRACT

Methods, systems, and devices for wireless communications are described. Generally, the described techniques provide for reporting a first and second stage of feedback for multiple physical downlink shared channels (PDSCHs) to reduce latency and improve reliability. The first stage of feedback may include hybrid automatic repeat request (HARQ) feedback for all PDSCHs or each PDSCH, and the second stage of feedback may include channel state information (CSI) feedback for all PDSCHs or each PDSCH. A user equipment (UE) may transmit the first and second stages of feedback in a single physical uplink control channel (PUCCH) or multiple PUCCHs (e.g., a PUCCH corresponding to each PDSCH). In some cases, the UE may report the HARQ and CSI feedback based on whether the PDSCHs include the same or different transport blocks or whether the PDSCHs are transmitted with the same or different transmission configuration indicator (TCI) states.

28 Claims, 18 Drawing Sheets

(58) Field of Classification Search
CPC ..... H04L 1/003; H04L 1/1896; H04L 1/1861; H04L 1/1671; H04L 1/0026
See application file for complete search history.

(56) References Cited

U.S. PATENT DOCUMENTS

| | | | |
|---|---|---|---|
| 2015/0043452 A1 | 2/2015 | Li et al. | |
| 2016/0234830 A1* | 8/2016 | Kim | H04W 72/563 |
| 2016/0261391 A1* | 9/2016 | Chen | H04L 1/1861 |
| 2016/0338089 A1* | 11/2016 | Vos | H04L 1/1861 |
| 2018/0069589 A1* | 3/2018 | Liu | H04L 5/0064 |
| 2018/0167931 A1* | 6/2018 | Papasakellariou | H04W 72/21 |
| 2019/0123923 A1* | 4/2019 | Belleschi | H04W 4/40 |
| 2019/0245661 A1 | 8/2019 | Baldemair et al. | |
| 2019/0349055 A1 | 11/2019 | Bhattad et al. | |
| 2019/0349917 A1* | 11/2019 | Huang | H04W 72/21 |
| 2020/0059327 A1* | 2/2020 | Kini | H04L 43/0823 |
| 2020/0119996 A1* | 4/2020 | Liu | H04W 72/12 |
| 2020/0136763 A1* | 4/2020 | Lee | H04L 1/0031 |
| 2020/0274660 A1* | 8/2020 | Xiong | H04L 5/0057 |
| 2020/0367208 A1* | 11/2020 | Khoshnevisan | H04L 5/1469 |
| 2021/0136802 A1* | 5/2021 | Cirik | H04W 72/1273 |
| 2021/0143870 A1* | 5/2021 | Faxér | H04L 5/0057 |
| 2021/0234628 A1* | 7/2021 | Nakamura | H04L 1/0061 |
| 2021/0314918 A1* | 10/2021 | Gao | H04W 72/0446 |
| 2021/0352501 A1* | 11/2021 | Taherzadeh Boroujeni | H04W 24/08 |
| 2021/0385810 A1* | 12/2021 | Sasaki | H04W 72/23 |
| 2022/0006590 A1* | 1/2022 | Wang | H04L 5/0053 |
| 2022/0021499 A1* | 1/2022 | Jiang | H04L 1/08 |
| 2022/0078766 A1* | 3/2022 | Li | H04L 5/0044 |
| 2022/0124768 A1* | 4/2022 | Frenne | H04L 1/08 |
| 2022/0174708 A1* | 6/2022 | Kim | H04L 1/1893 |
| 2022/0201680 A1* | 6/2022 | Ling | H04L 5/0055 |
| 2022/0232556 A1* | 7/2022 | Ren | H04L 5/14 |
| 2022/0360363 A1* | 11/2022 | Lin | H04L 1/203 |

OTHER PUBLICATIONS

Huawei., et al., "Summary of AI: 7.2.8.2 Enhancements on Multi-TRP/Panel Transmission of Offline Discussion", 3GPP Draft, 3GPP TSG RANWG1 Ad-Hoc Meeting 1901, R1-1901371 Feature Lead Summary for Enhancements on Multi-TRP V3, 3rd Generation Partnership Project (3GPP), Mobile Competence Centre, 650, Route Des Lucioles, F-06921 Sophia-Antipolis CE, vol. RAN WG1, No. Taipei, Jan. 21, 2019-Jan. 25, 2019, Jan. 23, 2019 (Jan. 23, 2019), XP051594129, 39 Pages, Retrieved from the Internet: URL: http://www.3gpp.org/ftp/Meetings%5F3GPP%5FSYNC/RAN1/Docs/R1%2D1901371%2Ezip, [retrieved on Jan. 23, 2019], Sections 2.2-2.3, p. 18-p. 24.

International Search Report and Written Opinion—PCT/US2021/014922—ISA/EPO—Apr. 20, 2021.

NTT Docomo., et al., "Enhancements on Multi-TRP/Panel Transmission", 3GPP Draft, R1-1906224, 3GPP TSG RAN WG1 #97, 3rd Generation Partnership Project (3GPP), Mobile Competence Centre, 650, Route Des Lucioles, F-06921Sophia-Antipolis Cedex, France,, vol. RAN WG1, No. Reno, USA; May 13, 2019-May 17, 2019, May 13, 2019, (May 13, 2019), 32 Pages, XP051727678, Retrieved from the Internet: URL: http://www.3gpp.org/ftp/Meetings%5F3GPP%5FSYNC/RAN1/Docs/R1%2D1906224%2Ezip [retrieved on May 13, 2019], p. 19, Paragraph 3.1.1—p. 21, Paragraph 3.1.2, Last Two Agreements, p. 2 Last Two Agreements, p. 3 Proposal 2-3, p. 6 p. 7 Proposal 2-4, p. 8 Proposal 2-11, p. 12, paragraph [0002]-paragraph [0003].

OPPO: "Discussion on HARQ-ACK Transmission", 3GPP TSG RAN WG1 Meeting #91, 3GPP Draft; R1-1719993, 3rd Generation Partnership Project (3GPP), Mobile Competence Centre, 650, Route Des Lucioles, F-06921 Sophia-Anti Polis Cedex, France vol. RAN WG1, No. Reno, USA; Nov. 27, 2017-Dec. 1, 2017, Nov. 18, 2017 (Nov. 18, 2017), 6 Pages, XP051369689, Retrieved from the Internet: URL: http://www.3gpp.org/ftp/tsg%5Fran/WG1%5FRL1/TSGR1%5F91/Docs/ [retrieved on Nov. 18, 2017] paragraphs [0002], [0004]; figure 5,.

Qualcomm Incorporated: "PDSCH Related Techniques for URLLC", 3GPP TSG RAN WG1 #92, 3GPP Draft; R1-1802350 PDSCH Related Techniques for URLLC, 3rd Generation Partnership Project (3GPP), Mobile Competence Centre; 650, Route Des Lucioles; F-06921 Sophia-Antipolis Cedex; France vol. RAN WG1, No. Athens, Greece; Feb. 26, 2018-Mar. 2, 2018, Feb. 17, 2018 (Feb. 17, 2018), pp. 1-7, XP051397878, Retrieved from the Internet: URL: http://www.3gpp.org/ftp/tsg%5Fran/WG1%5FRL1/TSGR1%5F92/Docs/ [retrieved on Feb. 17, 2018], Paragraph [0003].

OPPO: "Discussion on HARQ-ACK Transmission", 3GPP TSG RAN WG1 Meeting #91, R1-1719993, Reno, USA, Nov. 27-Dec. 1, 2017, 3rd Generation Partnership Project (3GPP), Mobile Competence Centre, 650, Route Des Lucioles, F-06921, Sophia-Antipolis Cedex, France, Nov. 18, 2017, 6 Pages.

* cited by examiner

TWO-STAGE FEEDBACK PROCEDURES FOR MULTIPLE DOWNLINK TRANSMISSIONS

CROSS REFERENCE

The present Application for Patent claims the benefit of U.S. Provisional Patent Application No. 62/993,455 by HUANG et al., entitled "TWO-STAGE FEEDBACK PROCEDURES FOR MULTIPLE DOWNLINK TRANSMISSIONS," filed Mar. 23, 2020, assigned to the assignee hereof, and expressly incorporated by reference herein.

FIELD OF TECHNOLOGY

The following relates generally to wireless communications and more specifically to two-stage feedback procedures for multiple downlink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UEs). In some wireless communications systems, a base station may transmit data to a UE, and the UE may be configured to provide feedback to the transmitting device for the data. The feedback may include HARQ feedback such as an acknowledgment (ACK) indicating that the data was successfully received and decoded or a negative acknowledgment (NACK) indicating that the receiving device failed to receive or decode the data. Improved techniques for providing feedback in a wireless communications system may be desirable.

SUMMARY

The described techniques relate to improved methods, systems, devices, and apparatuses that support turbo-hybrid automatic repeat request (HARQ) feedback with physical downlink shared channel (PDSCH) aggregation. Generally, the described techniques provide for reporting a first and second stage of feedback for multiple PDSCHs to reduce latency and improve reliability. The first stage of feedback may include HARQ feedback for all PDSCHs or each PDSCH, and the second stage of feedback may include channel state information (CSI) feedback for all PDSCHs or each PDSCH. A user equipment (UE) may transmit the first and second stages of feedback in a single physical uplink control channel (PUCCH) or multiple PUCCHs (e.g., a PUCCH corresponding to each PDSCH). In some cases, the UE may report the HARQ and CSI feedback based on whether the PDSCHs include the same or different transport blocks or whether the PDSCHs are transmitted with the same or different transmission configuration indicator (TCI) states.

A method of wireless communication at a UE is described. The method may include receiving a downlink grant scheduling a set of downlink transmissions from a base station to the UE, monitoring for the set of downlink transmissions from the base station, transmitting a first stage of feedback including at least one acknowledgment or negative acknowledgment for the set of downlink transmissions, and transmitting a second stage of feedback including at least one channel state information report or channel quality indicator for the set of downlink transmissions.

An apparatus for wireless communication at a UE is described. The apparatus may include a processor, memory coupled with the processor, and instructions stored in the memory. The instructions may be executable by the processor to cause the apparatus to receive a downlink grant scheduling a set of downlink transmissions from a base station to the UE, monitor for the set of downlink transmissions from the base station, transmit a first stage of feedback including at least one acknowledgment or negative acknowledgment for the set of downlink transmissions, and transmit a second stage of feedback including at least one channel state information report or channel quality indicator for the set of downlink transmissions.

Another apparatus for wireless communication at a UE is described. The apparatus may include means for receiving a downlink grant scheduling a set of downlink transmissions from a base station to the UE, monitoring for the set of downlink transmissions from the base station, transmitting a first stage of feedback including at least one acknowledgment or negative acknowledgment for the set of downlink transmissions, and transmitting a second stage of feedback including at least one channel state information report or channel quality indicator for the set of downlink transmissions.

A non-transitory computer-readable medium storing code for wireless communication at a UE is described. The code may include instructions executable by a processor to receive a downlink grant scheduling a set of downlink transmissions from a base station to the UE, monitor for the set of downlink transmissions from the base station, transmit a first stage of feedback including at least one acknowledgment or negative acknowledgment for the set of downlink transmissions, and transmit a second stage of feedback including at least one channel state information report or channel quality indicator for the set of downlink transmissions.

In some examples of the method, apparatuses, and non-transitory computer-readable medium described herein, transmitting the first stage of feedback may include operations, features, means, or instructions for transmitting the first stage of feedback including a single acknowledgment or negative acknowledgment for the set of downlink transmissions based on the set of downlink transmissions being associated with a same transmission configuration indication state and including a same transport block. In some examples of the method, apparatuses, and non-transitory computer-readable medium described herein, transmitting the second stage of feedback may include operations, features, means, or instructions for transmitting the second stage of feedback including a single channel state information report or channel quality indicator for the plurality of downlink transmissions based at least in part on the plurality of downlink transmissions being associated with the same transmission configuration indication state and including the same transport block. In some examples of the method, apparatuses, and non-transitory computer-readable medium described herein, the first stage of feedback and the second stage of feedback for the set of downlink transmissions may be transmitted in a same uplink control channel.

In some examples of the method, apparatuses, and non-transitory computer-readable medium described herein, transmitting the first stage of feedback may include operations, features, means, or instructions for transmitting the first stage of feedback including a single acknowledgment or negative acknowledgment for the set of downlink transmissions based on the set of downlink transmissions being associated with different transmission configuration indication states and including the same transport block. In some examples of the method, apparatuses, and non-transitory computer-readable medium described herein, transmitting the second stage of feedback may include operations, features, means, or instructions for transmitting the second stage of feedback including a channel state information report or channel quality indicator for each of the plurality of downlink transmissions based at least in part on the plurality of downlink transmissions being associated with the different transmission configuration indication states and including the same transport block. In some examples of the method, apparatuses, and non-transitory computer-readable medium described herein, the first stage of feedback for the set of downlink transmissions and the second stage of feedback for each of the set of downlink transmissions may be transmitted in a same uplink control channel.

In some examples of the method, apparatuses, and non-transitory computer-readable medium described herein, transmitting the first stage of feedback may include operations, features, means, or instructions for transmitting the first stage of feedback including an acknowledgment or negative acknowledgment for each of the set of downlink transmissions based on the set of downlink transmissions being associated with a same transmission configuration indication state and including different transport blocks. In some examples of the method, apparatuses, and non-transitory computer-readable medium described herein, transmitting the second stage of feedback may include operations, features, means, or instructions for transmitting the second stage of feedback including a channel state information report or channel quality indicator for each of the plurality of downlink transmissions based at least in part on the plurality of downlink transmissions being associated with the same transmission configuration indication state and including the different transport blocks. In some examples of the method, apparatuses, and non-transitory computer-readable medium described herein, the first stage of feedback and the second stage of feedback for each of the set of downlink transmissions may be transmitted in a respective uplink control channel.

In some examples of the method, apparatuses, and non-transitory computer-readable medium described herein, transmitting the first stage of feedback may include operations, features, means, or instructions for transmitting the first stage of feedback including an acknowledgment or negative acknowledgment for each of the set of downlink transmissions based on the set of downlink transmissions being associated with different transmission configuration indication states and including different transport blocks. In some examples of the method, apparatuses, and non-transitory computer-readable medium described herein, transmitting the second stage of feedback may include operations, features, means, or instructions for transmitting the second stage of feedback including a channel state information report or channel quality indicator for each of the plurality of downlink transmissions based at least in part on the plurality of downlink transmissions being associated with the different transmission configuration indication states and including the different transport blocks. In some examples of the method, apparatuses, and non-transitory computer-readable medium described herein, the first stage of feedback and the second stage of feedback for each of the set of downlink transmissions may be transmitted in a respective uplink control channel.

Some examples of the method, apparatuses, and non-transitory computer-readable medium described herein may further include operations, features, means, or instructions for receiving a retransmission of at least one of the set of downlink transmissions based on transmitting the first stage of feedback and the second stage of feedback. In some examples of the method, apparatuses, and non-transitory computer-readable medium described herein, a modulation and coding scheme or transmit power used for the retransmission may be based on the second stage of feedback. In some examples of the method, apparatuses, and non-transitory computer-readable medium described herein, a transmission configuration indication state used for the retransmission may be based on the first stage of feedback, the second stage of feedback, or both. In some examples of the method, apparatuses, and non-transitory computer-readable medium described herein, monitoring for the set of downlink transmissions may include operations, features, means, or instructions for monitoring a set of slots or carriers for the set of downlink transmissions. In some examples of the method, apparatuses, and non-transitory computer-readable medium described herein, the UE is configured to select whether to transmit the second stage of feedback based on whether the first stage of feedback includes an acknowledgment or negative acknowledgment.

A method of wireless communication at a base station is described. The method may include transmitting a downlink grant scheduling a set of downlink transmissions from the base station to a UE, transmitting the set of downlink transmissions based on transmitting the downlink grant, receiving a first stage of feedback including at least one acknowledgment or negative acknowledgment for the set of downlink transmissions, and receiving a second stage of feedback including at least one channel state information report or channel quality indicator for the set of downlink transmissions.

An apparatus for wireless communication at a base station is described. The apparatus may include a processor, memory coupled with the processor, and instructions stored in the memory. The instructions may be executable by the processor to cause the apparatus to transmit a downlink grant scheduling a set of downlink transmissions from the base station to a UE, transmit the set of downlink transmissions based on transmitting the downlink grant, receive a first stage of feedback including at least one acknowledgment or negative acknowledgment for the set of downlink transmissions, and receive a second stage of feedback including at least one channel state information report or channel quality indicator for the set of downlink transmissions.

Another apparatus for wireless communication at a base station is described. The apparatus may include means for transmitting a downlink grant scheduling a set of downlink transmissions from the base station to a UE, transmitting the set of downlink transmissions based on transmitting the downlink grant, receiving a first stage of feedback including at least one acknowledgment or negative acknowledgment for the set of downlink transmissions, and receiving a second stage of feedback including at least one channel state information report or channel quality indicator for the set of downlink transmissions.

A non-transitory computer-readable medium storing code for wireless communication at a base station is described. The code may include instructions executable by a processor to transmit a downlink grant scheduling a set of downlink transmissions from the base station to a UE, transmit the set of downlink transmissions based on transmitting the downlink grant, receive a first stage of feedback including at least one acknowledgment or negative acknowledgment for the set of downlink transmissions, and receive a second stage of feedback including at least one channel state information report or channel quality indicator for the set of downlink transmissions.

In some examples of the method, apparatuses, and non-transitory computer-readable medium described herein, transmitting the set of downlink transmissions may include operations, features, means, or instructions for transmitting a same transport block in accordance with a same transmission configuration indication state in the set of downlink transmissions. In some examples of the method, apparatuses, and non-transitory computer-readable medium described herein, receiving the first stage of feedback may include operations, features, means, or instructions for receiving the first stage of feedback including a single acknowledgment or negative acknowledgment for the plurality of downlink transmissions.

In some examples of the method, apparatuses, and non-transitory computer-readable medium described herein, receiving the second stage of feedback may include operations, features, means, or instructions for receiving the second stage of feedback including a single channel state information report or channel quality indicator for the plurality of downlink transmissions. In some examples of the method, apparatuses, and non-transitory computer-readable medium described herein, receiving the first stage of feedback and the second stage of feedback may include operations, features, means, or instructions for receiving the first stage of feedback and the second stage of feedback for the set of downlink transmissions in a same uplink control channel.

In some examples of the method, apparatuses, and non-transitory computer-readable medium described herein, transmitting the set of downlink transmissions may include operations, features, means, or instructions for transmitting a same transport block in accordance with different transmission configuration indication states in the set of downlink transmissions. In some examples of the method, apparatuses, and non-transitory computer-readable medium described herein, receiving the first stage of feedback may include operations, features, means, or instructions for receiving the first stage of feedback including a single acknowledgment or negative acknowledgment for the plurality of downlink transmissions.

In some examples of the method, apparatuses, and non-transitory computer-readable medium described herein, receiving the second stage of feedback may include operations, features, means, or instructions for receiving the second stage of feedback including a channel state information report or channel quality indicator for each of the plurality of downlink transmissions. In some examples of the method, apparatuses, and non-transitory computer-readable medium described herein, receiving the first stage of feedback and the second stage of feedback may include operations, features, means, or instructions for receiving the first stage of feedback for the set of downlink transmissions and the second stage of feedback for each of the set of downlink transmissions in a same uplink control channel.

In some examples of the method, apparatuses, and non-transitory computer-readable medium described herein, transmitting the set of downlink transmissions may include operations, features, means, or instructions for transmitting different transport blocks in accordance with a same transmission configuration indication state in the set of downlink transmissions. In some examples of the method, apparatuses, and non-transitory computer-readable medium described herein, receiving the first stage of feedback may include operations, features, means, or instructions for receiving the first stage of feedback including an acknowledgment or negative acknowledgment for each of the plurality of downlink transmissions.

In some examples of the method, apparatuses, and non-transitory computer-readable medium described herein, receiving the second stage of feedback may include operations, features, means, or instructions for receiving the second stage of feedback including a channel state information report or channel quality indicator for each of the plurality of downlink transmissions. In some examples of the method, apparatuses, and non-transitory computer-readable medium described herein, receiving the first stage of feedback and the second stage of feedback may include operations, features, means, or instructions for receiving the first stage of feedback and the second stage of feedback for each of the set of downlink transmissions in a respective uplink control channel.

In some examples of the method, apparatuses, and non-transitory computer-readable medium described herein, transmitting the set of downlink transmissions may include operations, features, means, or instructions for transmitting different transport blocks in accordance with different transmission configuration indication states in the set of downlink transmissions. In some examples of the method, apparatuses, and non-transitory computer-readable medium described herein, receiving the first stage of feedback may include operations, features, means, or instructions for receiving the first stage of feedback including an acknowledgment or negative acknowledgment for each of the plurality of downlink transmissions.

In some examples of the method, apparatuses, and non-transitory computer-readable medium described herein, receiving the second stage of feedback may include operations, features, means, or instructions for receiving the second stage of feedback including a channel state information report or channel quality indicator for each of the plurality of downlink transmissions. In some examples of the method, apparatuses, and non-transitory computer-readable medium described herein, receiving the first stage of feedback and the second stage of feedback may include operations, features, means, or instructions for receiving the first stage of feedback and the second stage of feedback for each of the set of downlink transmissions in a respective uplink control channel.

Some examples of the method, apparatuses, and non-transitory computer-readable medium described herein may further include operations, features, means, or instructions for retransmitting at least one of the set of downlink transmissions based on the first stage of feedback and the second stage of feedback. Some examples of the method, apparatuses, and non-transitory computer-readable medium described herein may further include operations, features, means, or instructions for determining a modulation and coding scheme or transmit power for retransmitting the at least one of the set of downlink transmissions based on the second stage of feedback.

Some examples of the method, apparatuses, and non-transitory computer-readable medium described herein may further include operations, features, means, or instructions for determining a transmission configuration indication state for retransmitting the at least one of the set of downlink transmissions based on the first stage of feedback, the second stage of feedback, or both. In some examples of the method, apparatuses, and non-transitory computer-readable medium described herein, transmitting the set of downlink transmissions may include operations, features, means, or instructions for transmitting the set of downlink transmissions in a set of slots or carriers.

DETAILED DESCRIPTION

Some wireless communications systems may support low latency communications between a user equipment (UE) and a base station. In some cases, a base station may schedule multiple downlink transmissions (e.g., low latency downlink transmissions) to a UE in multiple physical downlink shared channels (PDSCHs). The UE may be configured to report hybrid automatic repeat request (HARQ) feedback for the multiple PDSCHs. In particular, the UE may transmit an acknowledgment (ACK) indicating that the UE successfully received and decoded the multiple PDSCHs or each PDSCH. Alternatively, the UE may transmit a negative ACK (NACK) indicating that the UE failed to receive or decode the multiple PDSCHs or each PDSCH. If the base station receives a NACK for at least one PDSCH, the base station may retransmit the at least one PDSCH to the UE. However, because the NACK may simply indicate that the UE failed to receive or decode the at least one PDSCH, the base station may not be able to adapt the retransmission based on the feedback, resulting in reduced reliability.

As described herein, a UE may support efficient techniques for reporting feedback for multiple PDSCHs to a base station to reduce latency and improve reliability. The feedback may include HARQ feedback for all PDSCHs or each PDSCH (or some group of PDSCHs) and CSI feedback for all PDSCHs or each PDSCH (or some group of PDSCHs). The base station may use the CSI feedback to identify suitable configurations for retransmitting at least one of the PDSCHs to increase the likelihood that the retransmitted PDSCH is successfully received and decoded by the UE. The UE may transmit the first and second stages of feedback in a single physical uplink control channel (PUCCH) or multiple PUCCHs (e.g., a PUCCH corresponding to each PDSCH). In some cases, the UE may report the HARQ and CSI feedback based on whether the PDSCHs include the same or different transport blocks or whether the PDSCHs are transmitted with the same or different transmission configuration indicator (TCI) states.

Aspects of the disclosure introduced above are described below in the context of a wireless communications system. Examples of processes and signaling exchanges that support two-stage feedback procedures for multiple downlink transmissions are then described. Aspects of the disclosure are further illustrated by and described with reference to apparatus diagrams, system diagrams, and flowcharts that relate to two-stage feedback procedures for multiple downlink transmissions.

Figure 1:
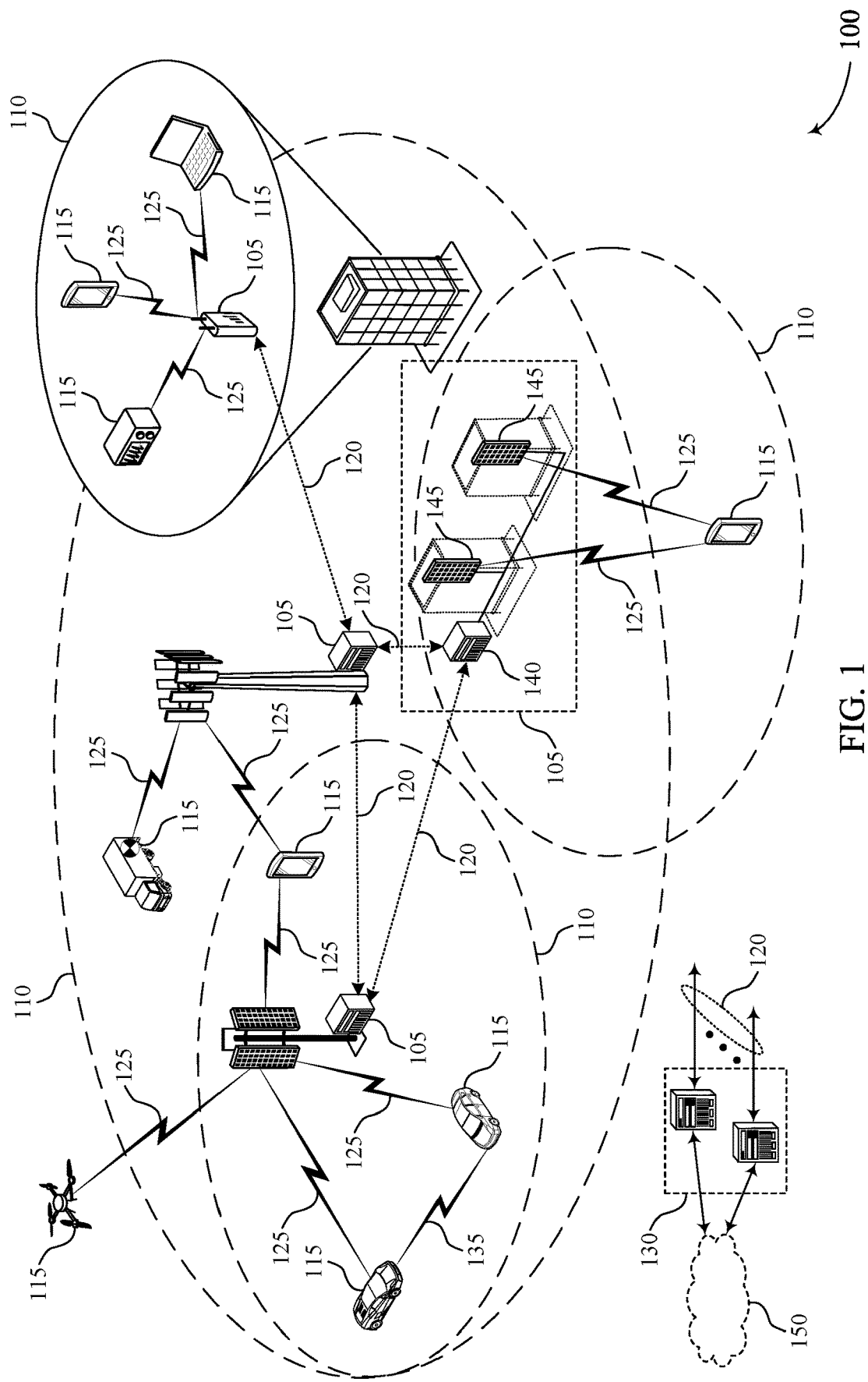
FIG. 1 illustrates an example of a wireless communications system that supports two-stage feedback procedures for multiple downlink transmissions in accordance with aspects of the present disclosure.

FIG. 1 illustrates an example of a wireless communications system 100 that supports two-stage feedback procedures for multiple downlink transmissions in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, ultra-reliable low latency communications (URLLC), communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105 (e.g., in a physical uplink shared channel (PUSCH) or a PUCCH), or downlink transmissions from a base station 105 to a UE 115 (e.g., in a PDSCH or a physical downlink control channel (PDCCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S$-1/$(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the Medium Access Control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As mentioned above, wireless communications system 100 may support low latency communications between a UE 115 and a base station 105. In some cases, a base station 105 may schedule multiple downlink transmissions (e.g., low latency downlink transmissions) to a UE 115 in multiple PDSCHs. The UE 115 may be configured to report HARQ feedback for the multiple PDSCHs. In particular, the UE 115 may transmit an ACK indicating that the UE 115 successfully received and decoded the multiple PDSCHs or each PDSCH. Alternatively, the UE 115 may transmit a NACK indicating that the UE 115 failed to receive or decode the multiple PDSCHs or each PDSCH. If the base station 105 receives a NACK for at least one PDSCH, the base station 105 may retransmit the at least one PDSCH to the UE 115. However, because the NACK may simply indicate that the UE 115 failed to receive or decode the at least one PDSCH (e.g., the NACK may not provide a reason that the UE 115 failed to receive or decode the at least one PDSCH or any further information), the base station 105 may not be able to adapt the retransmission based on the feedback, resulting in reduced reliability. As described herein, a UE 115 in wireless communications system 100 may support efficient techniques for reporting feedback for multiple PDSCHs to a base station 105 to reduce latency and improve reliability.

Figure 2:
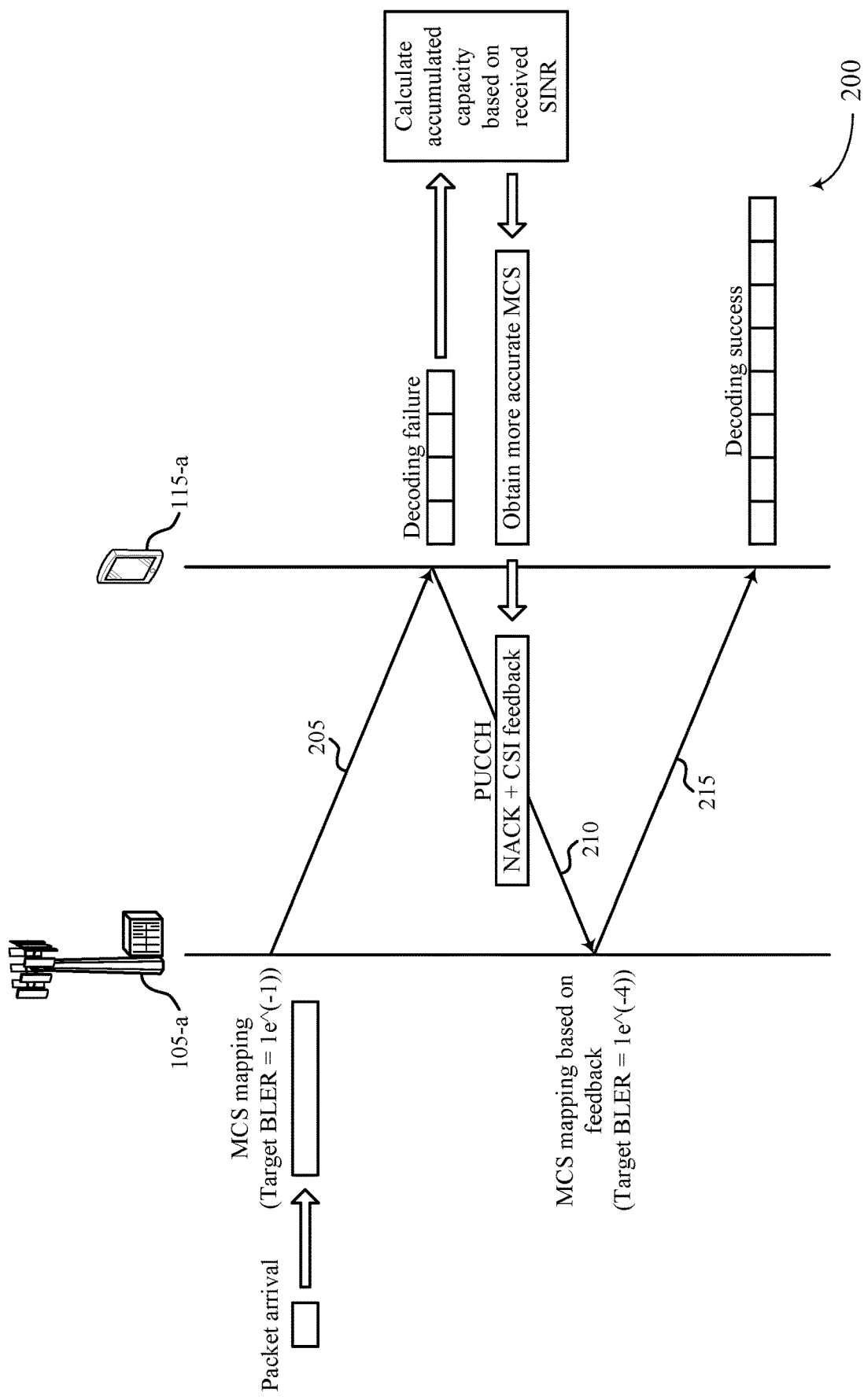
FIG. 2 illustrates an example of a process flow illustrating two-stage feedback reporting for a single physical downlink shared channel (PDSCH) in accordance with aspects of the present disclosure.

FIG. 2 illustrates an example of a process flow 200 illustrating two-stage feedback reporting for a single PDSCH in accordance with aspects of the present disclosure. Process flow 200 illustrates aspects of techniques performed by a UE 115-a, which may be an example of a UE 115 described with reference to FIG. 1. Process flow 200 also illustrates aspects of techniques performed by a base station 105-a, which may be an example of a base station 105 described with reference to FIG. 1. In the example of FIG. 2, the base station 105-a may identify a packet to transmit to a UE 115-a in a PDSCH (e.g., packet arrival, where the packet may arrive at a lower layer at the UE 115-a). The base station 105-a may also identify a suitable configuration for transmitting the PDSCH to the UE 115-a. For instance, the base station 105-a may identify a modulation and coding scheme (MCS) to use to transmit the PDSCH to achieve a target block error rate (BLER) (e.g., target BLER=$1e^{-1}$). The target BLER for the original transmission of the PDSCH may be preconfigured for low latency communications between the base station 105-*a* and the UE 115-*a*.

At 205, the base station 105-*a* may transmit the PDSCH to the UE 115-*a* using the identified MCS. The UE 115-*a* may receive the PDSCH and may fail to decode the PDSCH or the UE 115-*a* may fail to receive the PDSCH altogether. However, instead of simply reporting a NACK, the UE 115-*a* may also report CSI feedback to the base station 105-*a*. That is, the UE 115-*a* may be configured to report a first stage of feedback including HARQ feedback (e.g., the NACK) and a second stage of feedback including the CSI feedback for the PDSCH. Thus, the UE 115-*a* may determine a received signal to interference plus noise ratio (SINR) for the PDSCH transmitted by the base station 105-*a*, and the UE 115-*a* may calculate an accumulated capacity based on the received SINR (e.g., a channel capacity or rate of information transfer over the channel). The UE 115-*a* may then obtain an updated MCS for the base station 105-*a* based on the accumulated capacity (e.g., a more accurate MCS).

At 210, the UE 115-*a* may transmit the NACK (e.g., first stage of feedback) and the CSI feedback (e.g., second stage of feedback) to the base station 105-*a* in a PUCCH. The base station 105-*a* may receive the two stages of feedback and may identify a suitable configuration for retransmitting the PDSCH to the UE 115-*a* based on the two stages of feedback. For instance, the base station 105-*a* may identify an MCS to use to retransmit the PDSCH based on the indicated MCS in the CSI feedback to achieve a target BLER (e.g., target BLER=$1e^{-4}$). The target BLER for the retransmission of the PDSCH may be preconfigured for low latency communications between the base station 105-*a* and the UE 115-*a*. Further, the target BLER for the retransmission may be lower than the target BLER for the original transmission to improve reliability. In some cases, the base station 105-*a* may determine the coding length and resources to use for the retransmission based on the CSI feedback.

At 215, the base station 105-*a* may then retransmit the PDSCH to the UE 115-*a* using the identified MCS. The UE 115-*a* may successfully receive and decode the retransmission from the base station 105-*a*. Thus, using the two-stage feedback, the latency of communications between the base station 105-*a* and the UE 115-*a* may be reduced (i.e., less latency may be achieved by reducing to only a single retransmission). Further, faster CSI (or channel quality indicator (CQI)) feedback may result in improved reliability (e.g., for the first retransmission).

Figure 3:
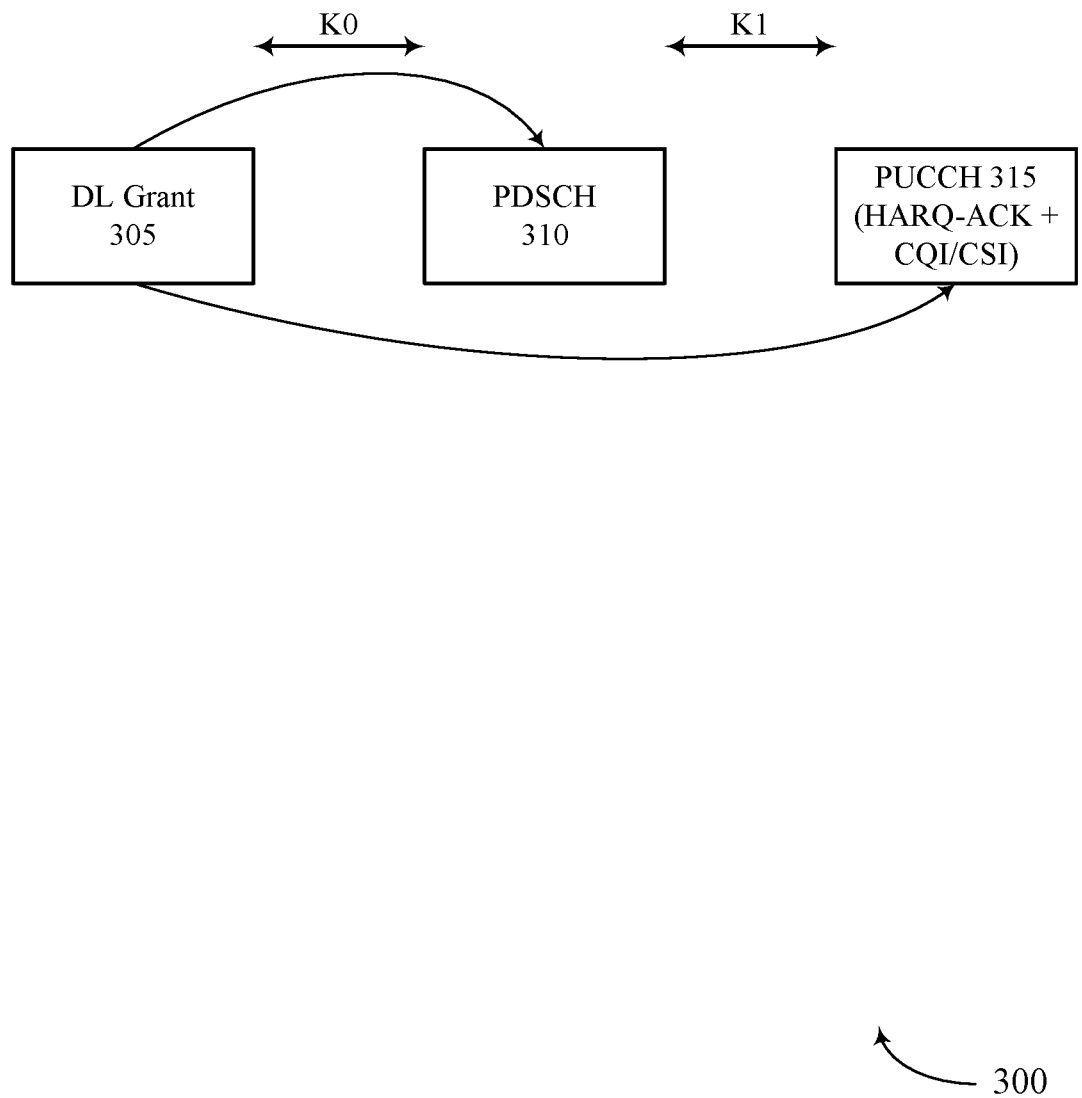
FIG. 3 illustrates an example of a block diagram illustrating two-stage feedback reporting for a single PDSCH in accordance with aspects of the present disclosure.

FIG. 3 illustrates an example of a block diagram 300 illustrating two-stage feedback reporting for a single PDSCH in accordance with aspects of the present disclosure. In the example of FIG. 3, a base station 105 may transmit a downlink grant 305 to a UE 115 scheduling a downlink transmission in a PDSCH 310 to the UE 115. The UE 115 may receive the PDSCH 310 and may report two-stage feedback to the base station 105 for the PDSCH 310. In particular, the UE 115 may transmit a HARQ ACK or NACK and CSI feedback for the PDSCH 310 in a PUCCH 315 allocated by the downlink grant 305. The base station 105 may then adjust a configuration for retransmitting the PDSCH 310 based on the CSI feedback. Thus, the associated or bundled CQI or CSI feedback with HARQ feedback may allow the base station 105 to perform faster and more accurate MCS, rate, or transmit power adaption for a retransmission (e.g., for URLLC to allow for more reliable retransmissions). The two-stage feedback may be referred to as turbo-HARQ feedback. With turbo-HARQ feedback, a single retransmission may be sufficient to achieve high reliability (e.g., BLER=$10^{-5}$) and low latency (e.g., 5 ms). With only HARQ feedback, more retransmissions may be used since MCS, rate, or transmit power adaption may be slower.

Figure 4:
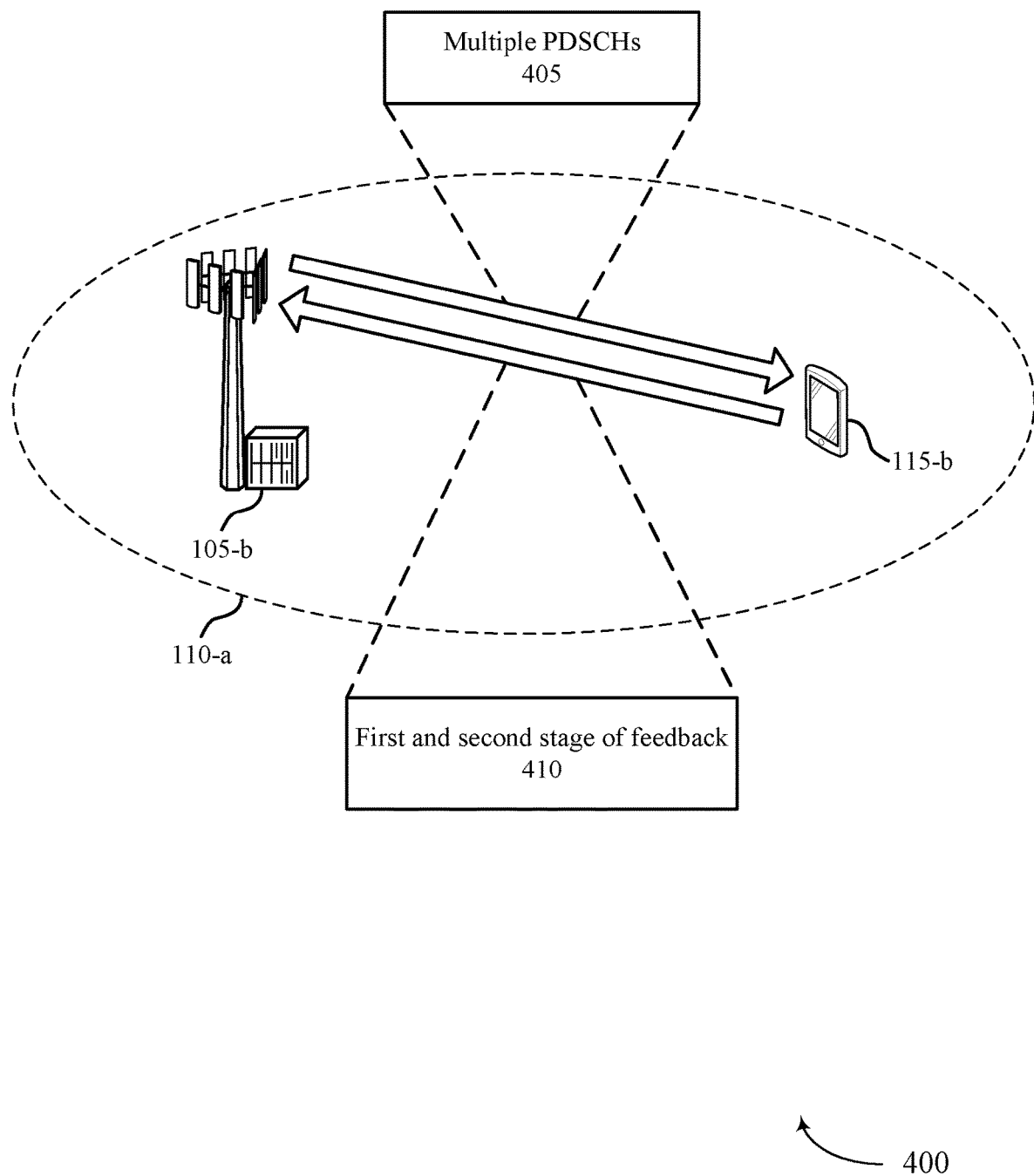
FIG. 4 illustrates an example of a wireless communications system that supports two-stage feedback procedures for multiple downlink transmissions in accordance with aspects of the present disclosure.

FIG. 4 illustrates an example of a wireless communications system 400 that supports two-stage feedback procedures for multiple downlink transmissions in accordance with aspects of the present disclosure. The wireless communications system 400 includes a UE 115-*b*, which may be an example of a UE 115 described with reference to FIGS. 1-3. The wireless communications system 400 also includes a base station 105-*b*, which may be an example of a base station 105 described with reference to FIGS. 1-3. The base station 105-*b* may provide communication coverage for a coverage area 110-*a*. The wireless communications system 400 may implement aspects of wireless communications system 100. For example, the UE 115-*b* in wireless communications system 400 may support efficient techniques for reporting feedback for multiple PDSCHs to the base station 105-*b* to reduce latency and improve reliability.

In the example of FIG. 4, the base station 105-*b* may transmit a downlink grant (e.g., one or more downlink grants, such as a single downlink grant or multiple downlink grants) to the UE 115-*b* scheduling downlink transmissions in multiple PDSCHs 405 from the base station 105-*b* to the UE 115-*b*. The UE 115-*b* may receive the downlink grant and may monitor for the multiple PDSCHs from the base station 105-*a*. In some cases, the UE 115-*b* may receive and successfully decode all the PDSCHs. In other cases, the UE 115-*b* may receive and fail to decode at least one of the PDSCHs or fail to receive the at least one PDSCH altogether. In any case, the UE 115-*b* may be configured to report a first and a second stage of feedback 410 to the base station 105-*a* for the multiple PDSCHs (e.g., based on failing to decode the at least one of the PDSCHs). The first stage of feedback may include HARQ feedback for all PDSCHs or each PDSCH, and the second stage of feedback may include CSI feedback for all PDSCHs or each PDSCH. The UE 115-*b* may transmit the feedback in a single PUCCH or multiple PUCCHs (e.g., a PUCCH corresponding to each PDSCH). In some cases, the UE 115-*b* may report the HARQ and CSI feedback based on whether the PDSCHs include the same or different transport blocks or whether the PDSCHs are transmitted with the same or different TCI states. A TCI state may be linked to a beam, and a PDSCH transmitted with the TCI state or in accordance with the TCI state may correspond to a PDSCH transmitted using the beam linked to the TCI state.

Figure 5:
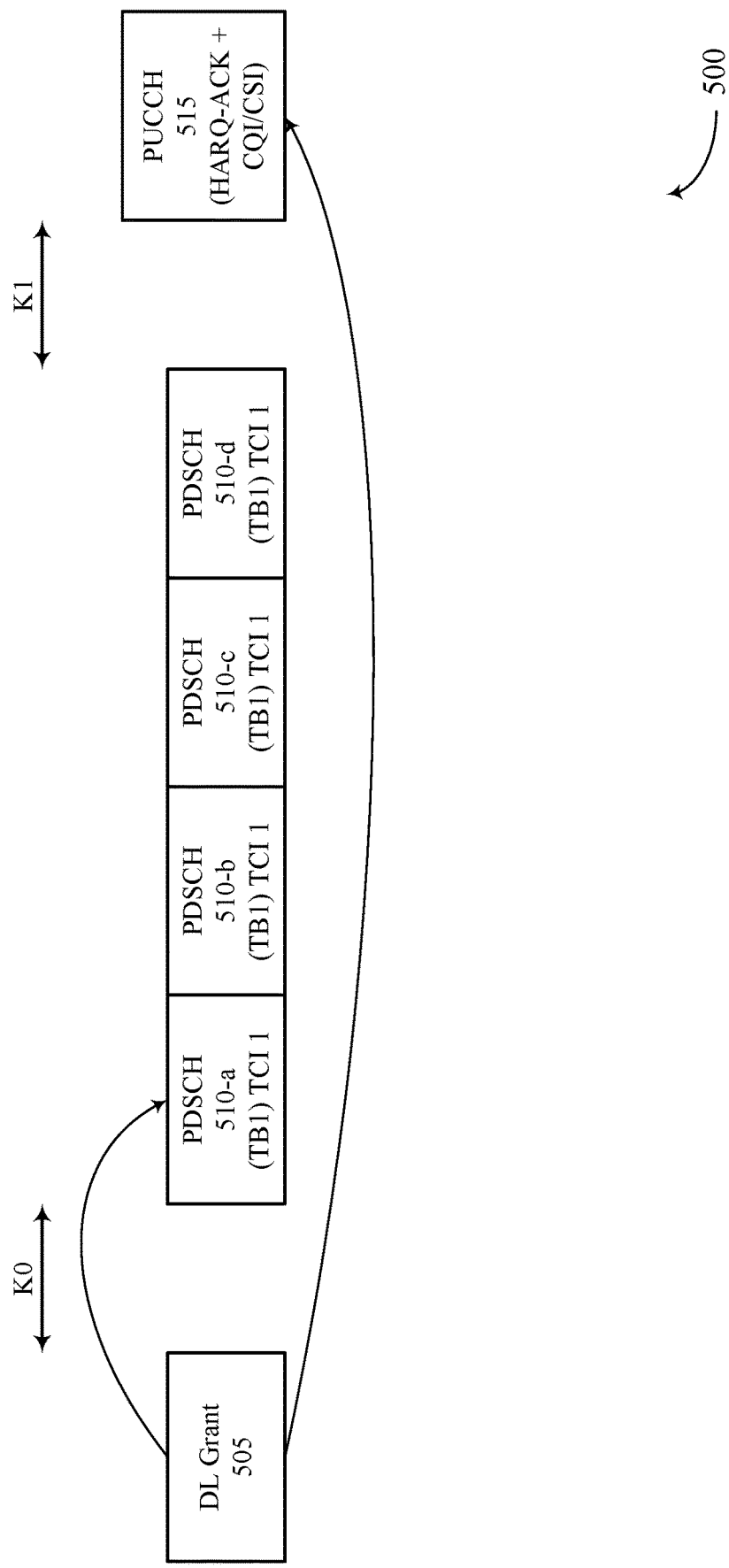
FIGS. 5-8 illustrate examples of block diagrams illustrating two-stage feedback for multiple PDSCHs in accordance with aspects of the present disclosure.

FIG. 5 illustrates an example of a block diagram 500 illustrating two-stage feedback for multiple PDSCHs in accordance with aspects of the present disclosure. In the example of FIG. 5, a base station 105 may transmit a downlink grant 505 to a UE 115 scheduling downlink transmissions in multiple PDSCHs 510 to the UE 115 (e.g., in multiple slots or multiple carriers). In some examples, the downlink grant 505 may schedule an aggregated downlink transmission in multiple PDSCHs 510 over a set of consecutive TTIs (e.g., consecutive slots). For example, the downlink grant 505 may be a one downlink grant trigger for transmitting a same transport block, using a same TCI state, that is repeated over multiple slots or component carriers. The UE 115 may receive the downlink grant 505 and may monitor for the multiple PDSCHs 510 from the base station 105. In the example of FIG. 5, the base station 105 may transmit the same transport block in the multiple PDSCHs 510 using the same TCI state (e.g., the same beam). The UE 115 may determine that the same transport block is included in the multiple PDSCHs 510 and determine that the same TCI state is configured for the multiple PDSCHs 510. Thus, the UE 115 may report feedback for the multiple PDSCHs 510 based on the PDSCHs 510 including the same transport block and being associated with the same TCI state.

In particular, the UE 115 may transmit a first stage of feedback including a single ACK or NACK for the multiple PDSCHs 510 (e.g., aggregated HARQ feedback) and a second stage of feedback including a single CSI report (or CQI) for the multiple PDSCHs 510. When the multiple PDSCHs 510 each transport the same transport block (TB), the single ACK may indicate that the transport block transmitted in at least one of the PDSCHs 510 was successfully decoded by the UE 115. The UE 115 may combine the log-likelihood ratio (LLR) obtained from multiple PDSCHs to decode the transport block. The single NACK may indicate that the transport block transmitted in the PDSCHs 510 was not successfully decoded by the UE 115 (even after the UE 115 combined LLRs from all the PDSCHs carrying the same transport block). The UE 115 may transmit the single ACK or NACK (e.g., a single bit) and the single CSI report in the same PUCCH 515 (e.g., in a single PUCCH time and frequency resource). The single CSI report may be based on an SINR and/or LLR averaged over the PDSCHs 510 and derived from attempting to decode the multiple PDSCHs 510. If the UE 115 successfully decoded at least one of the PDSCHs 510 with potential combining of the LLRs with other PDSCHs carrying the same transport block, the UE 115 may report an ACK in the aggregated HARQ feedback (e.g., since the PDSCHs 510 may all include the same transport block). The UE 115 may also optionally report the CSI together in the same PUCCH 515 with the ACK to the base station 105. For instance, in some cases, the UE 115 may report the CSI together with the ACK, and, in other cases, the UE 115 may refrain from reporting the CSI together with the ACK. If the UE 115 failed to receive or decode all of the PDSCHs 510 with potential combining of the LLRs within all PDSCHs carrying the same transport block, the UE 115 may report a NACK in the aggregated HARQ feedback. The UE 115 may also report the CSI together in the same PUCCH 515 with the NACK to the base station 105. In this case, the base station 105 may receive the NACK and may use the CSI feedback included in the PUCCH 515 with the NACK to identify suitable configurations for retransmitting the transport block to the UE 115. For example, the base station 105 may identify an MCS, TCI state, etc. for retransmitting the transport block based on the CSI feedback. Because the base station 105 may adapt the retransmission based on the CSI feedback, the likelihood of the UE 115 receiving the retransmission may be increased.

Figure 6:
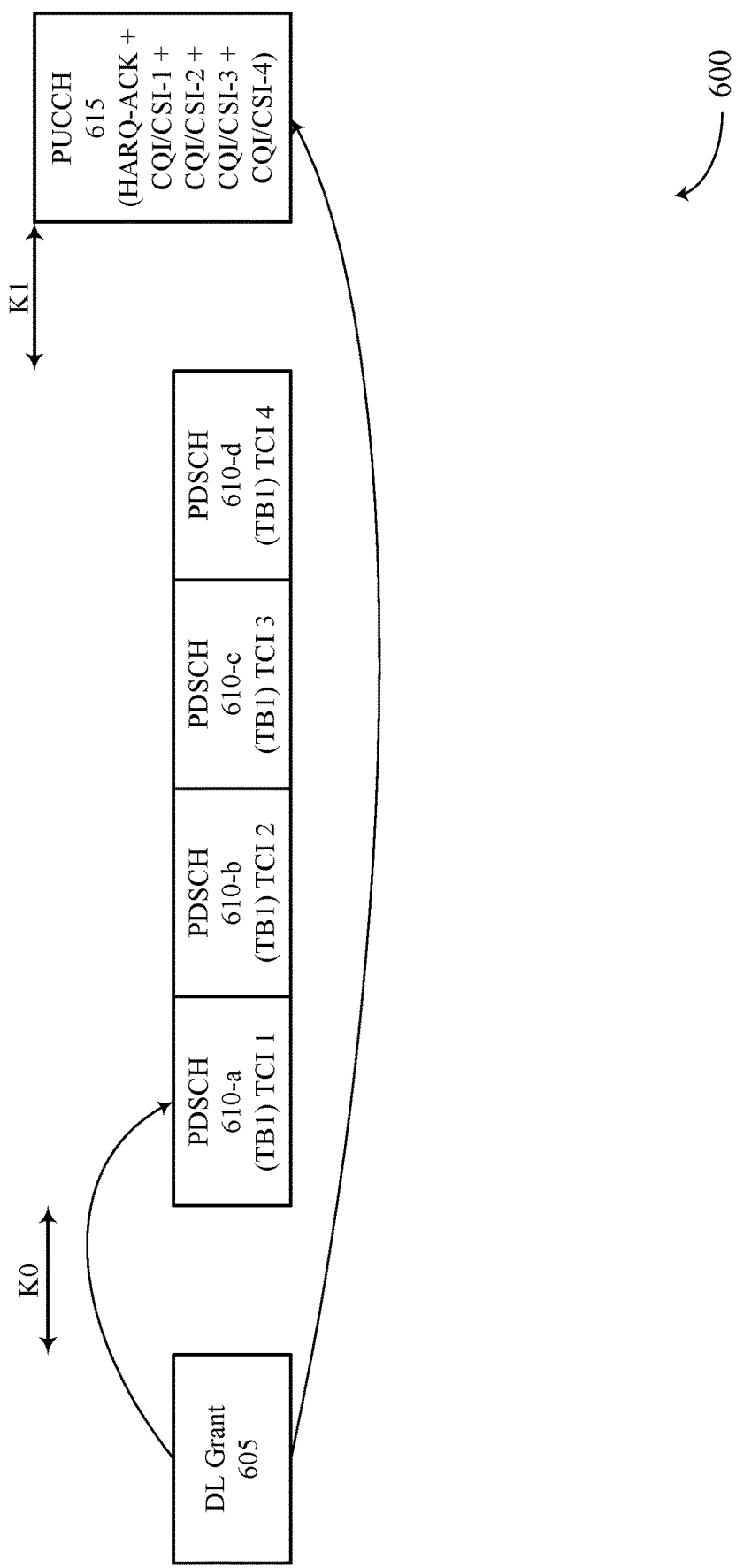

FIG. 6 illustrates an example of a block diagram 600 illustrating two-stage feedback for multiple PDSCHs in accordance with aspects of the present disclosure. In the example of FIG. 6, a base station 105 may transmit a downlink grant 605 to a UE 115 scheduling downlink transmissions in multiple PDSCHs 610 to the UE 115 (e.g., in multiple slots or multiple carriers). The UE 115 may receive the downlink grant 605 and may monitor for the multiple PDSCHs 610 from the base station 105. For example, the downlink grant 605 may be a one downlink grant trigger for transmitting a same transport block, using different TCI states, where the transport block is repeated over multiple slots or component carriers. In the example of FIG. 6, the base station 105 may transmit the same transport block in the multiple PDSCHs 610 using different TCI states (e.g., different beams). The UE 115 may determine that the same transport block is included in the multiple PDSCHs 610 and determine that different TCI states are configured for the multiple PDSCHs 610. Thus, the UE 115 may report feedback for the multiple PDSCHs 610 based on the PDSCHs 610 including the same transport block and being associated with different TCI states.

In particular, the UE 115 may transmit a first stage of feedback including a single ACK or NACK for the multiple PDSCHs 610 (e.g., aggregated HARQ feedback) and a second stage of feedback including a CSI report (or CQI) for each of the multiple PDSCHs 610. The UE 115 may transmit the single ACK or NACK (e.g., a single bit) and the multiple CSI reports in the same PUCCH 615 (e.g., in a single PUCCH time and frequency resource). The CSI report for a corresponding PDSCH 610 may be based on an SINR or LLR derived from attempting to decode the PDSCH. For example, the multiple CSI reports may include a first CSI report for PDSCH 610-*a* transmitted using a first TCI state (e.g., TCI 1), a second CSI report for PDSCH 610-*b* transmitted using a second TCI state (e.g., TCI 2), a third CSI report for PDSCH 610-*c* transmitted using a third TCI state (e.g., TCI 3), and a fourth CSI report for PDSCH 610-*d* transmitted using a fourth TCI state (e.g., TCI 4).

If the UE 115 successfully decoded at least one of the PDSCHs 610 with potential combining of the LLRs with other PDSCHs carrying the same TB, the UE 115 may report an ACK in the aggregated HARQ feedback (e.g., since the PDSCHs 610 may all include the same transport block). The UE 115 may also optionally report the CSI together in the same PUCCH 615 with the ACK to the base station 105. For instance, in some cases, the UE 115 may report the CSI together with the ACK, and, in other cases, the UE 115 may refrain from reporting the CSI together with the ACK. If the UE 115 failed to receive or decode all of the PDSCHs 610 with potential combining of the LLRs within all PDSCHs carrying the same transport block, the UE 115 may report a NACK in the aggregated HARQ feedback. The UE 115 may also report the CSI together in the same PUCCH 615 with the NACK to the base station 105. In this case, the base station 105 may receive the NACK and may use the CSI feedback included in the PUCCH 615 with the NACK to identify suitable configurations for retransmitting the transport block to the UE 115. For example, the base station 105 may identify an MCS, TCI state, etc. for retransmitting the transport block based on the CSI feedback in the multiple CSI reports. For example, the base station 105 may use the CQI feedback for the different PDSCHs 610-*a* to 610-*d* to select one of the TCI states (e.g., select the best of TCI states 1 to 4) for retransmission or for a later new transmission. Because the base station 105 may adapt the retransmission based on the CSI feedback, the likelihood of the UE 115 receiving the retransmission may be increased.

Figure 7:
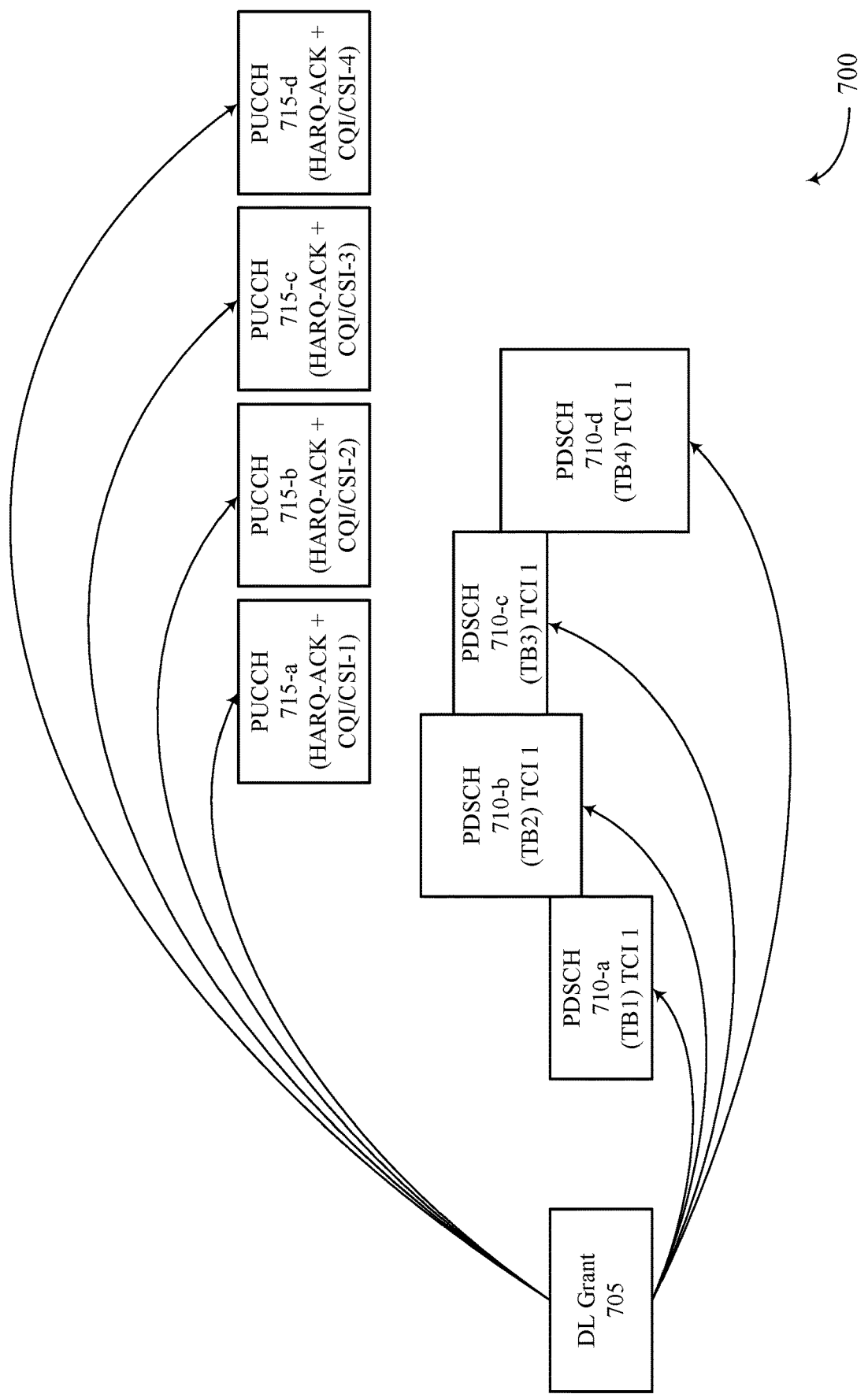

FIG. 7 illustrates an example of a block diagram 700 illustrating two-stage feedback for multiple PDSCHs in accordance with aspects of the present disclosure. In the example of FIG. 7, a base station 105 may transmit a downlink grant 705 to a UE 115 scheduling downlink transmissions in multiple PDSCHs 710 to the UE 115 (e.g., in multiple slots or multiple carriers). The UE 115 may receive the downlink grant 705 and may monitor for the multiple PDSCHs 710 from the base station 105. For example, the downlink grant 705 may be a one downlink grant trigger for transmitting different (e.g., multiple) transport blocks, each using a same TCI state, transmitted over multiple slots or component carriers. In the example of FIG.

7, the base station 105 may transmit different transport blocks in the multiple PDSCHs 710 using the same TCI state (e.g., the same beam). The UE 115 may determine that different transport blocks are included in the multiple PDSCHs 710 and determine that the same TCI state is configured for the multiple PDSCHs 710. Thus, the UE 115 may report feedback for the multiple PDSCHs 710 based on the PDSCHs 710 including different transport blocks and being associated with the same TCI state.

In particular, the UE 115 may transmit a first stage of feedback including an ACK or NACK for each of the multiple PDSCHs 710 (e.g., 4 bits, one bit for each of PDSCH 710-*a* to 710-*d*) and a second stage of feedback including a CSI report (or CQI) for each of the multiple PDSCHs 710. For instance, the UE 115 may transmit HARQ feedback (e.g., an ACK or NACK) for each PDSCH 710 (e.g., PDSCH 710-*a*) in a respective PUCCH 715 (e.g., PUCCH 715-*a*), where each of PUCCHs 715-*a* to 715-*d* is in a different PUCCH time and frequency resource. The downlink grant 705 may allocate a PUCCH 715 corresponding to each PDSCH 710. The CSI report for a corresponding PDSCH 710 may be based on an SINR or LLR derived from attempting to decode the PDSCH 710. For example, a first PUCCH 715-*a* may include a first HARQ feedback and a first CSI report for PDSCH 710-*a*, a second PUCCH 715-*b* may include a second HARQ feedback and a second CSI report for PDSCH 710-*b*, a third PUCCH 715-*c* may include a third HARQ feedback and a third CSI report for PDSCH 710-*c*, and a fourth PUCCH 715-*d* may include a fourth HARQ feedback and a fourth CSI report for PDSCH 710-*d*.

If the UE 115 successfully received a PDSCH 710, the UE 115 may report an ACK for the PDSCH 710 in a respective PUCCH 715. The UE 115 may also optionally report the CSI together in the same PUCCH 715 with the ACK to the base station 105. For instance, in some cases, the UE 115 may report the CSI together with the ACK, and, in other cases, the UE 115 may refrain from reporting the CSI together with the ACK. If the UE 115 failed to receive or decode a PDSCH 710, the UE 115 may report a NACK for the PDSCH 710 in a respective PUCCH 715. The UE 115 may report the CSI together in the same PUCCH 715 with the NACK to the base station 105. In this case, the base station 105 may receive the NACK for the PDSCH 710 and may use the CSI feedback included in the PUCCH 715 with the NACK to identify suitable configurations for retransmitting a transport block to the UE 115 (e.g., the transport block in the PDSCH 710). For example, the base station 105 may identify an MCS, TCI state, etc. for retransmitting the transport block based on the CSI feedback. In an example, the base station 105 may select at least one TCI state from the multiple TCI states for a retransmission or a new transmission based on the CSI feedback received for PDSCHs 710-*a* to 710-*d*. Because the base station 105 may adapt the retransmission based on the CSI feedback, the likelihood of the UE 115 receiving the retransmission may be increased.

Figure 8:
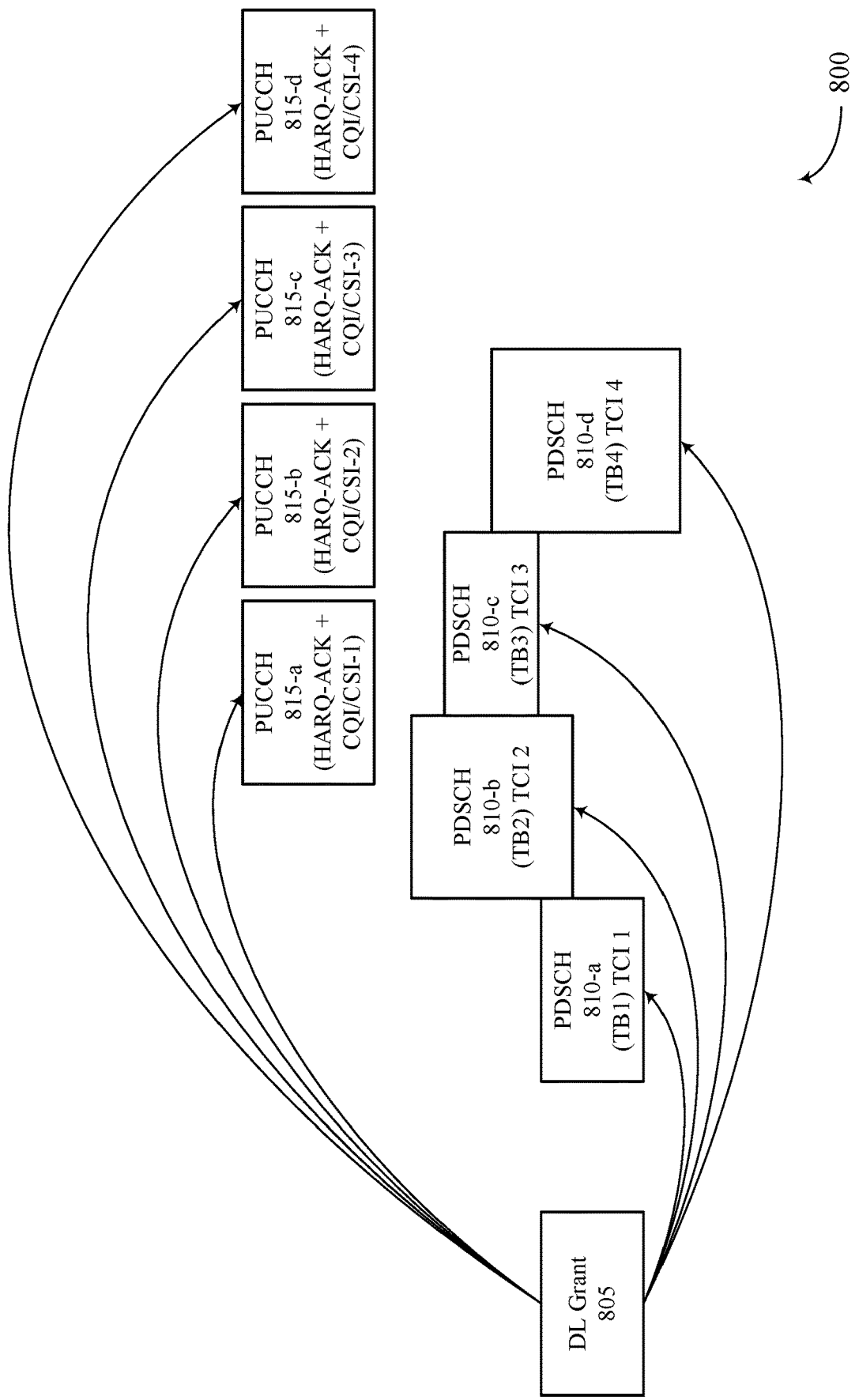

FIG. 8 illustrates an example of a block diagram 800 illustrating two-stage feedback for multiple PDSCHs in accordance with aspects of the present disclosure. In the example of FIG. 8, a base station 105 may transmit a downlink grant 805 to a UE 115 scheduling downlink transmissions in multiple PDSCHs 810 to the UE 115 (e.g., in multiple slots or multiple carriers). The UE 115 may receive the downlink grant 805 and may monitor for the multiple PDSCHs 810 from the base station 105. For example, the downlink grant 805 may be a one downlink grant trigger for transmitting different (e.g., multiple) transport blocks, each using a different TCI state, transmitted over multiple slots or component carriers. In the example of FIG. 8, the base station 105 may transmit different transport blocks in the multiple PDSCHs 810 using different TCI states (e.g., different beams). The UE 115 may determine that different transport blocks are included in the multiple PDSCHs 810 and determine that different TCI states are configured for the multiple PDSCHs 810. Thus, the UE 115 may report feedback for the multiple PDSCHs 810 based on the PDSCHs 810 including different transport blocks and being associated with different TCI states.

In particular, the UE 115 may transmit a first stage of feedback including an ACK or NACK for each of the multiple PDSCHs 810 and a second stage of feedback including a CSI report (or CQI) for each of the multiple PDSCHs 810. For instance, the UE 115 may transmit HARQ feedback (e.g., an ACK or NACK) for each PDSCH 810 (e.g., PDSCH 810-*a*) in a respective PUCCH 815 (e.g., PUCCH 815-*a*), where each of PUCCHs 815-*a* to 815-*d* is in a different PUCCH time and frequency resource. The downlink grant 805 may allocate a PUCCH 815 corresponding to each PDSCH 810. The CSI report for a corresponding PDSCH 810 may be based on an SINR or LLR derived from attempting to decode the PDSCH 810. If the UE 115 successfully received a PDSCH 810, the UE 115 may report an ACK for the PDSCH 810 in a respective PUCCH 815. For example, a first PUCCH 815-*a* may include a first HARQ feedback and a first CSI report for PDSCH 810-*a* transmitted using a first TCI state (e.g., TCI 1), a second PUCCH 815-*b* may include a second HARQ feedback and a second CSI report for PDSCH 810-*b* transmitted using a second TCI state (e.g., TCI 2), a third PUCCH 815-*c* may include a third HARQ feedback and a third CSI report for PDSCH 810-*c* transmitted using a third TCI state (e.g., TCI 3), and a fourth PUCCH 815-*d* may include a fourth HARQ feedback and a fourth CSI report for PDSCH 810-*d* transmitted using a fourth TCI state (e.g., TCI 4).

If the UE 115 successfully received a PDSCH 810, the UE 115 may report an ACK for the PDSCH 810 in a respective PUCCH 815. The UE 115 may also optionally report the CSI together in the same PUCCH 815 with the ACK to the base station 105. For instance, in some cases, the UE 115 may report the CSI together with the ACK, and, in other cases, the UE 115 may refrain from reporting the CSI together with the ACK. If the UE 115 failed to receive or decode a PDSCH 810, the UE 115 may report a NACK for the PDSCH 810 in a respective PUCCH 815. The UE 115 may also transmit a CSI report with the NACK in the same PUCCH 815. In this case, the base station 105 may receive the NACK for the PDSCH 810 and may use the CSI feedback included in the PUCCH 815 with the NACK to identify suitable configurations for retransmitting a transport block to the UE 115 (e.g., the transport block in the PDSCH 810). For example, the base station 105 may identify an MCS, TCI state, etc. for retransmitting the transport block based on the CSI feedback. In an example, the base station 105 may select at least one TCI state from the multiple TCI states for a retransmission or a new transmission based on the CSI feedback received for PDSCHs 810-*a* to 810-*d*. Because the base station 105 may adapt the retransmission based on the CSI feedback, the likelihood of the UE 115 receiving the retransmission may be increased.

Figure 9:
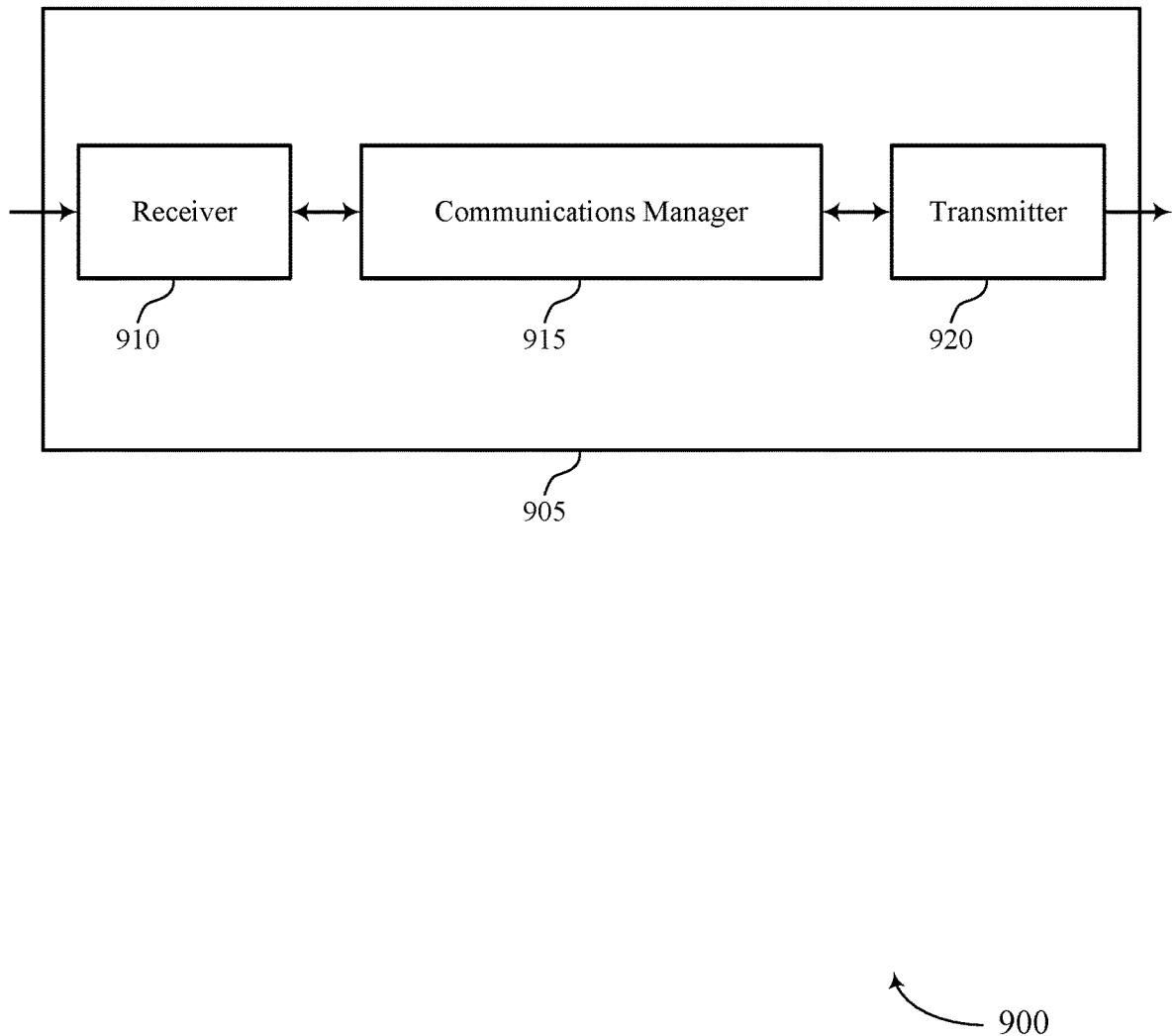
FIGS. 9 and 10 show block diagrams of devices that support two-stage feedback procedures for multiple downlink transmissions in accordance with aspects of the present disclosure.

FIG. 9 shows a block diagram 900 of a device 905 that supports two-stage feedback procedures for multiple downlink transmissions in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to two-stage feedback procedures for multiple downlink transmissions, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be implemented as an integrated circuit or chipset for the device 905, and the receiver 910 and the transmitter 920 may be implemented as analog components (for example, amplifiers, filters, antennas) coupled with the device 905 modem to enable wireless transmission and reception. The actions performed by the communications manager 915 as described herein may be implemented to realize one or more potential advantages. At least one implementation may enable the communications manager 915 to efficient techniques for reporting feedback for multiple PDSCHs to a base station to reduce latency and improve reliability.

For example, the communications manager 915 may receive a downlink grant scheduling a set of downlink transmissions from a base station to the UE, monitor for the set of downlink transmissions from the base station, transmit a first stage of feedback including at least one acknowledgment or negative acknowledgment for the set of downlink transmissions, and transmit a second stage of feedback including at least one channel state information report or channel quality indicator for the set of downlink transmissions. The communications manager 915 may be an example of aspects of the communications manager 1210 described herein. By transmitting the first and second stages of feedback for the set of downlink transmissions, one or more processors of the device 905 (for example, processor(s) controlling or incorporated with the communications manager 915) may experience power savings (e.g., increased battery life) since the second stage of feedback may allow a base station to improve the reliability of retransmissions, and the UE may monitor for a limited number of retransmissions from the base station.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
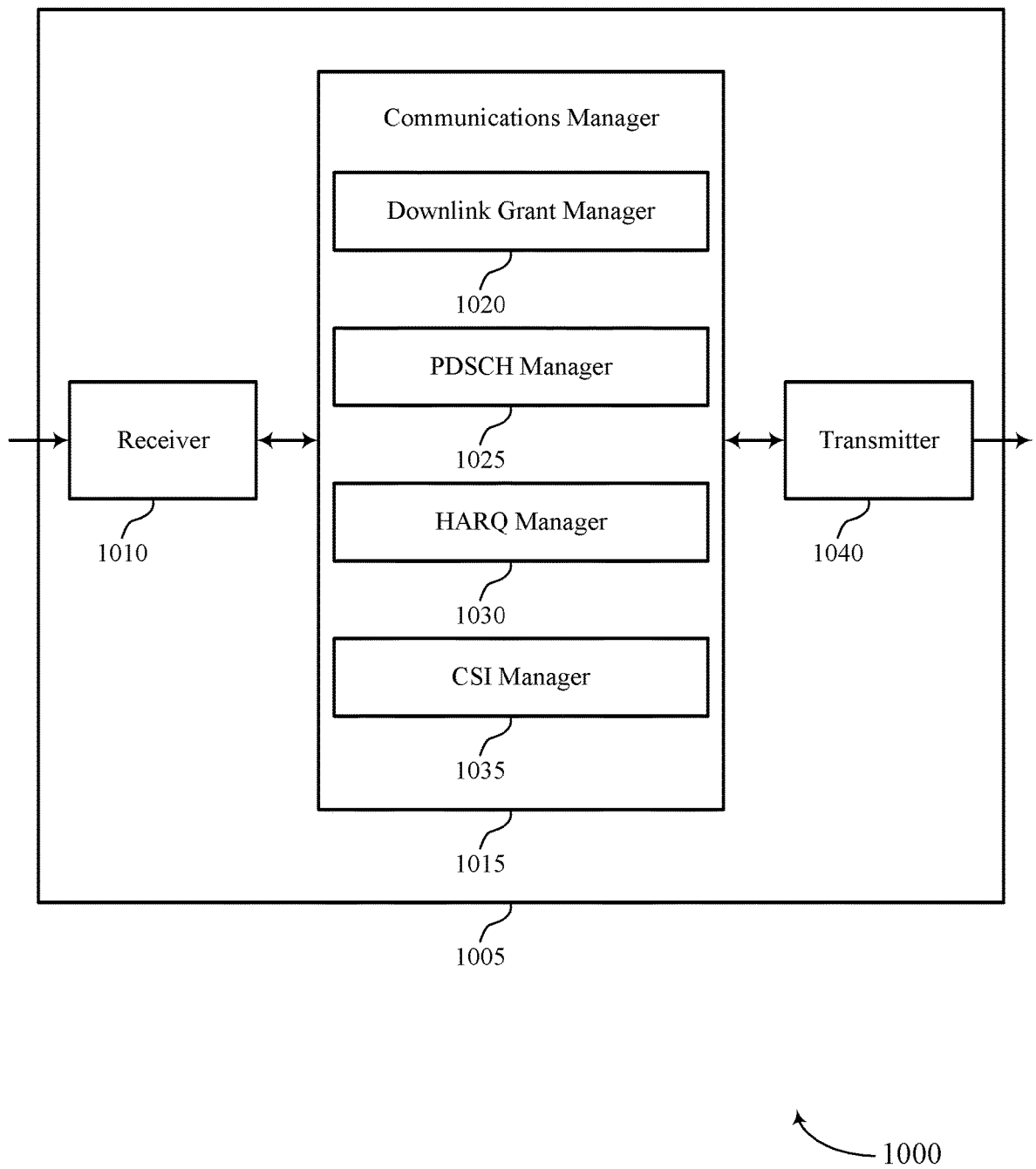

FIG. 10 shows a block diagram 1000 of a device 1005 that supports two-stage feedback procedures for multiple downlink transmissions in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to two-stage feedback procedures for multiple downlink transmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a downlink grant manager 1020, a PDSCH manager 1025, a HARQ manager 1030, and a CSI manager 1035. The communications manager 1015 may be an example of aspects of the communications manager 1210 described herein.

The downlink grant manager 1020 may receive a downlink grant scheduling a set of downlink transmissions from a base station to the UE. The PDSCH manager 1025 may monitor for the set of downlink transmissions from the base station. The HARQ manager 1030 may transmit a first stage of feedback including at least one acknowledgment or negative acknowledgment for the set of downlink transmissions. The CSI manager 1035 may transmit a second stage of feedback including at least one channel state information report or channel quality indicator for the set of downlink transmissions.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
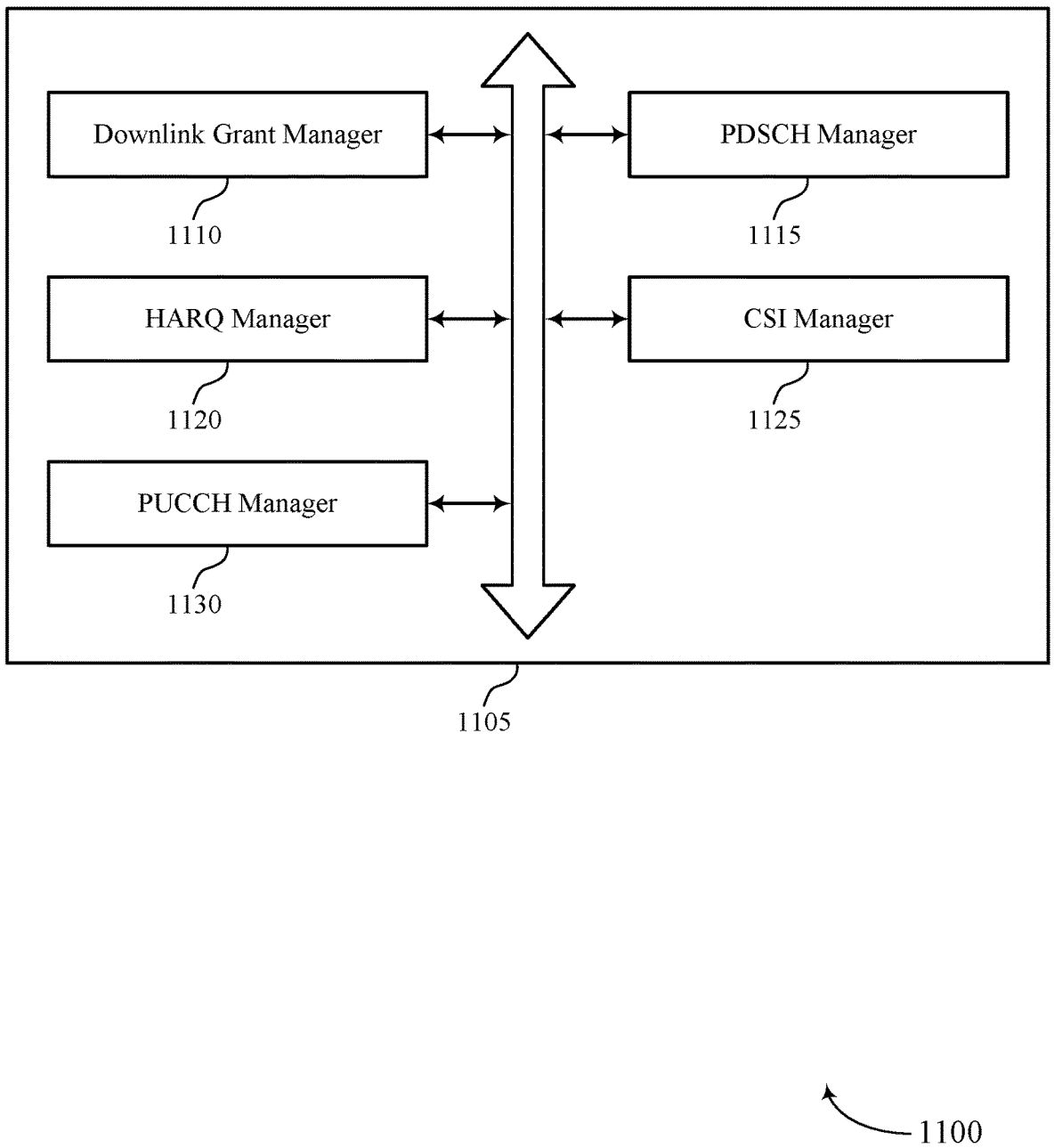
FIG. 11 shows a block diagram of a communications manager that supports two-stage feedback procedures for multiple downlink transmissions in accordance with aspects of the present disclosure.

FIG. 11 shows a block diagram 1100 of a communications manager 1105 that supports two-stage feedback procedures for multiple downlink transmissions in accordance with aspects of the present disclosure. The communications manager 1105 may be an example of aspects of a communications manager 915, a communications manager 1015, or a communications manager 1210 described herein. The communications manager 1105 may include a downlink grant manager 1110, a PDSCH manager 1115, a HARQ manager 1120, a CSI manager 1125, and a PUCCH manager 1130.

Each of these modules may communicate, directly or indirectly, with one another (e.g., via one or more buses).

The downlink grant manager 1110 may receive a downlink grant scheduling a set of downlink transmissions from a base station to the UE. The PDSCH manager 1115 may monitor for the set of downlink transmissions from the base station. The HARQ manager 1120 may transmit a first stage of feedback including at least one acknowledgment or negative acknowledgment for the set of downlink transmissions. The CSI manager 1125 may transmit a second stage of feedback including at least one channel state information report or channel quality indicator for the set of downlink transmissions.

In some examples, the HARQ manager 1120 may transmit the first stage of feedback including a single acknowledgment or negative acknowledgment for the set of downlink transmissions based on the set of downlink transmissions being associated with a same transmission configuration indication state and including a same transport block. In some examples, the CSI manager 1125 may transmit the second stage of feedback including a single channel state information report or channel quality indicator for the plurality of downlink transmissions based at least in part on the plurality of downlink transmissions being associated with the same transmission configuration indication state and including the same transport block. The PUCCH manager 1130 may transmit the first stage of feedback and the second stage of feedback for the set of downlink transmissions in a same uplink control channel.

In some examples, the HARQ manager 1120 may transmit the first stage of feedback including a single acknowledgment or negative acknowledgment for the set of downlink transmissions based on the set of downlink transmissions being associated with different transmission configuration indication states and including the same transport block. In some examples, the CSI manager 1125 may transmit the second stage of feedback comprising a channel state information report or channel quality indicator for each of the plurality of downlink transmissions based at least in part on the plurality of downlink transmissions being associated with the different transmission configuration indication states and comprising the same transport block. The PUCCH manager 1130 may transmit the first stage of feedback for the set of downlink transmissions and the second stage of feedback for each of the set of downlink transmissions in a same uplink control channel.

In some examples, the HARQ manager 1120 may transmit the first stage of feedback including an acknowledgment or negative acknowledgment for each of the set of downlink transmissions based on the set of downlink transmissions being associated with a same transmission configuration indication state and including different transport blocks. In some examples, the CSI manager 1125 may transmit the second stage of feedback comprising a channel state information report or channel quality indicator for each of the plurality of downlink transmissions based at least in part on the plurality of downlink transmissions being associated with the same transmission configuration indication state and comprising the different transport blocks. The PUCCH manager 1130 may transmit the first stage of feedback and the second stage of feedback for each of the set of downlink transmissions in a respective uplink control channel.

In some examples, the HARQ manager 1120 may transmit the first stage of feedback including an acknowledgment or negative acknowledgment for each of the set of downlink transmissions based on the set of downlink transmissions being associated with different transmission configuration indication states and including different transport blocks. In some examples, the CSI manager 1125 may transmit the second stage of feedback comprising a channel state information report or channel quality indicator for each of the plurality of downlink transmissions based at least in part on the plurality of downlink transmissions being associated with the same transmission configuration indication state and comprising the different transport blocks. The PUCCH manager 1130 may transmit the first stage of feedback and the second stage of feedback for each of the set of downlink transmissions in a respective uplink control channel.

In some examples, the PDSCH manager 1115 may receive a retransmission of at least one of the set of downlink transmissions based on transmitting the first stage of feedback and the second stage of feedback. In some cases, a modulation and coding scheme or transmit power used for the retransmission is based on the second stage of feedback. In some cases, a transmission configuration indication state used for the retransmission is based on the first stage of feedback, the second stage of feedback, or both. In some examples, the PDSCH manager 1115 may monitor a set of slots or carriers for the set of downlink transmissions. In some examples, the UE is configured to select whether to transmit the second stage of feedback based on whether the first stage of feedback comprises an acknowledgment or negative acknowledgment.

Figure 12:
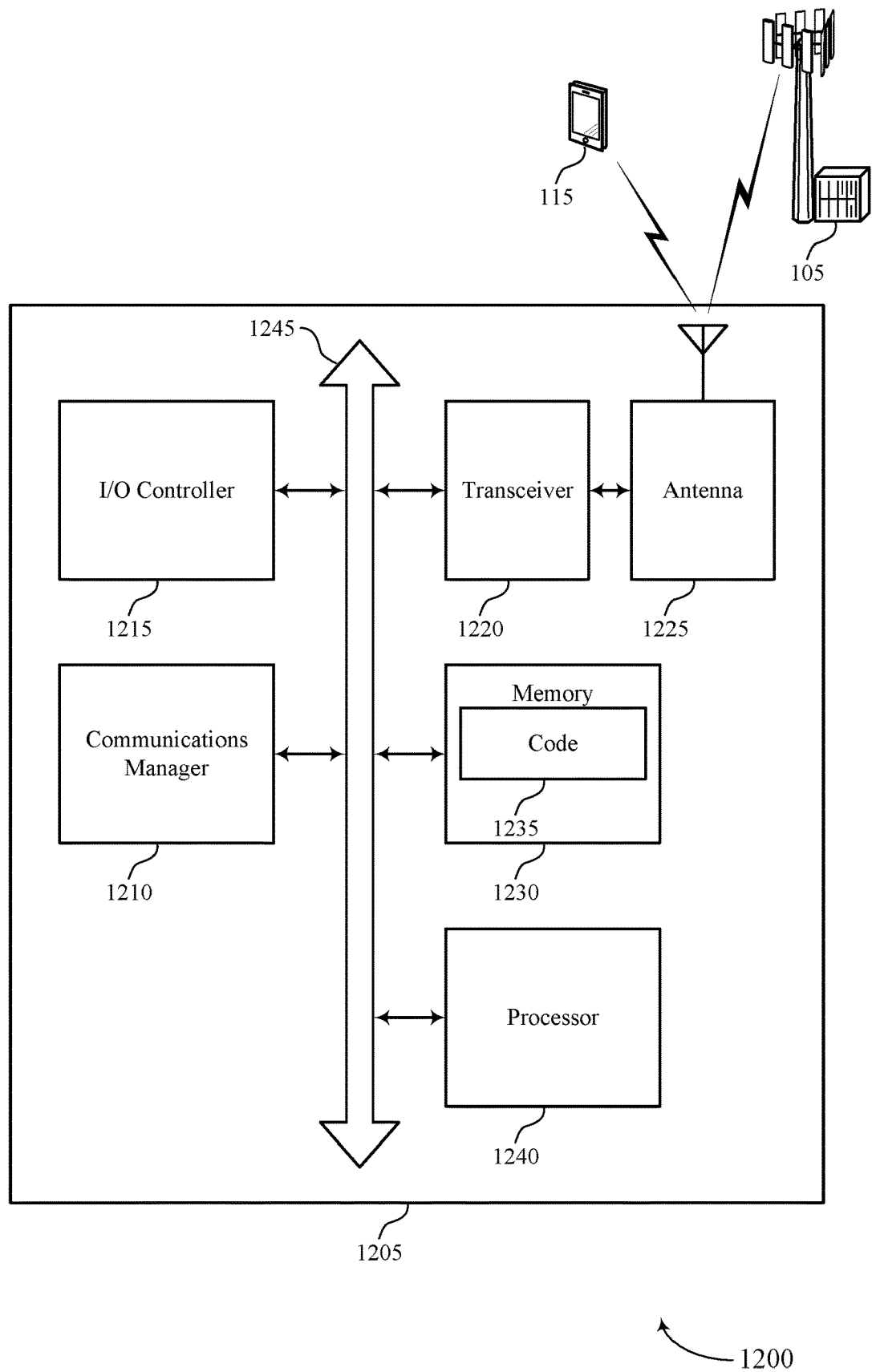
FIG. 12 shows a diagram of a system including a device that supports two-stage feedback procedures for multiple downlink transmissions in accordance with aspects of the present disclosure.

FIG. 12 shows a diagram of a system 1200 including a device 1205 that supports two-stage feedback procedures for multiple downlink transmissions in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive a downlink grant scheduling a set of downlink transmissions from a base station to the UE, monitor for the set of downlink transmissions from the base station, transmit a first stage of feedback including at least one acknowledgment or negative acknowledgment for the set of downlink transmissions, and transmit a second stage of feedback including at least one channel state information report or channel quality indicator for the set of downlink transmissions.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting two-stage feedback procedures for multiple downlink transmissions).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
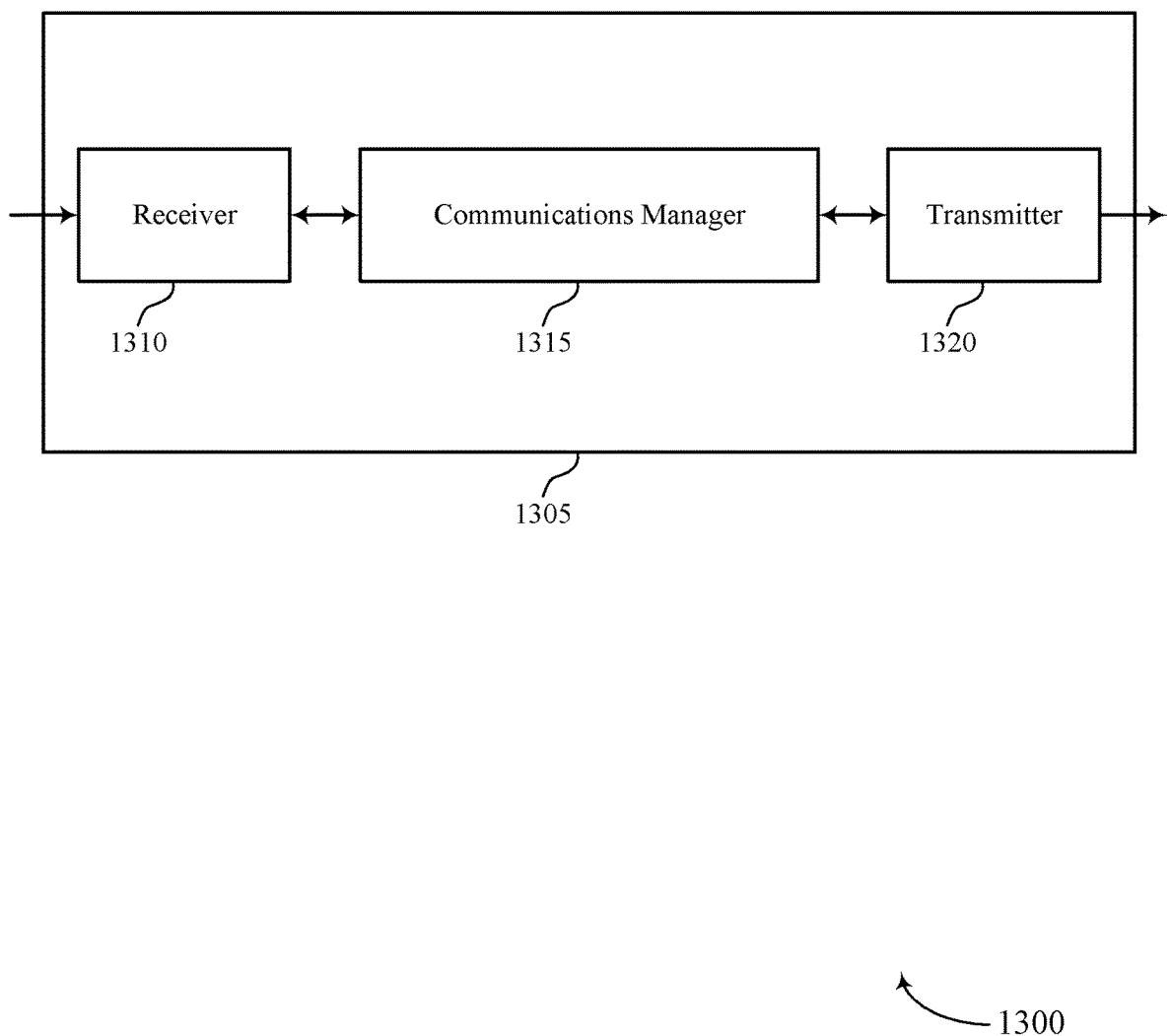
FIGS. 13 and 14 show block diagrams of devices that support two-stage feedback procedures for multiple downlink transmissions in accordance with aspects of the present disclosure.

FIG. 13 shows a block diagram 1300 of a device 1305 that supports two-stage feedback procedures for multiple downlink transmissions in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to two-stage feedback procedures for multiple downlink transmissions, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may be implemented as an integrated circuit or chipset for the device 1305, and the receiver 1310 and the transmitter 1320 may be implemented as analog components (for example, amplifiers, filters, antennas) coupled with the device 1305 modem to enable wireless transmission and reception. The actions performed by the communications manager 1315 as described herein may be implemented to realize one or more potential advantages. At least one implementation may enable the communications manager 1315 to efficient techniques for reporting feedback for multiple PDSCHs to a base station to reduce latency and improve reliability.

For example, the communications manager 1315 may transmit a downlink grant scheduling a set of downlink transmissions from the base station to a UE, transmit the set of downlink transmissions based on transmitting the downlink grant, receive a first stage of feedback including at least one acknowledgment or negative acknowledgment for the set of downlink transmissions, and receive a second stage of feedback including at least one channel state information report or channel quality indicator for the set of downlink transmissions. The communications manager 1315 may be an example of aspects of the communications manager 1610 described herein. By receiving the first and second stages of feedback for the set of downlink transmissions, one or more processors of the device 1305 (for example, processor(s) controlling or incorporated with the communications manager 1315) may experience power savings (e.g., increased battery life) since the base station may improve the reliability of retransmissions using the second stage of feedback, and the base station may transmit a limited number of retransmissions to the UE.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
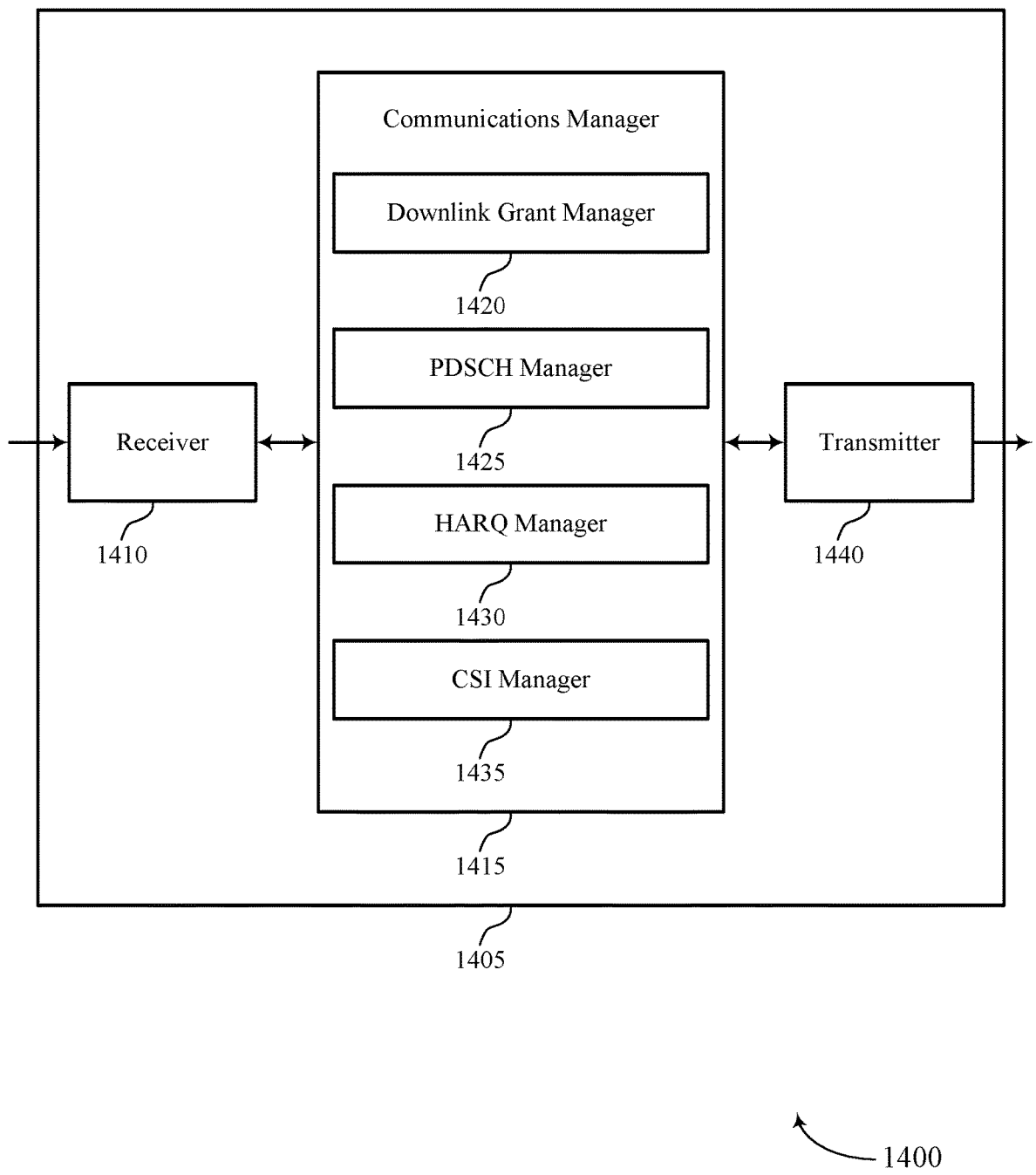

FIG. 14 shows a block diagram 1400 of a device 1405 that supports two-stage feedback procedures for multiple downlink transmissions in accordance with aspects of the present disclosure. The device 1405 may be an example of aspects of a device 1305, or a base station 105 as described herein. The device 1405 may include a receiver 1410, a communications manager 1415, and a transmitter 1440. The device

1405 may also include a processor. Each of these components may be in communication with one another (e.g., via one or more buses).

The receiver 1410 may receive information such as packets, user data, or control information associated with various information channels (e.g., control channels, data channels, and information related to two-stage feedback procedures for multiple downlink transmissions, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a downlink grant manager 1420, a PDSCH manager 1425, a HARQ manager 1430, and a CSI manager 1435. The communications manager 1415 may be an example of aspects of the communications manager 1610 described herein.

The downlink grant manager 1420 may transmit a downlink grant scheduling a set of downlink transmissions from the base station to a UE. The PDSCH manager 1425 may transmit the set of downlink transmissions based on transmitting the downlink grant. The HARQ manager 1430 may receive a first stage of feedback including at least one acknowledgment or negative acknowledgment for the set of downlink transmissions. The CSI manager 1435 may receive a second stage of feedback including at least one channel state information report or channel quality indicator for the set of downlink transmissions.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
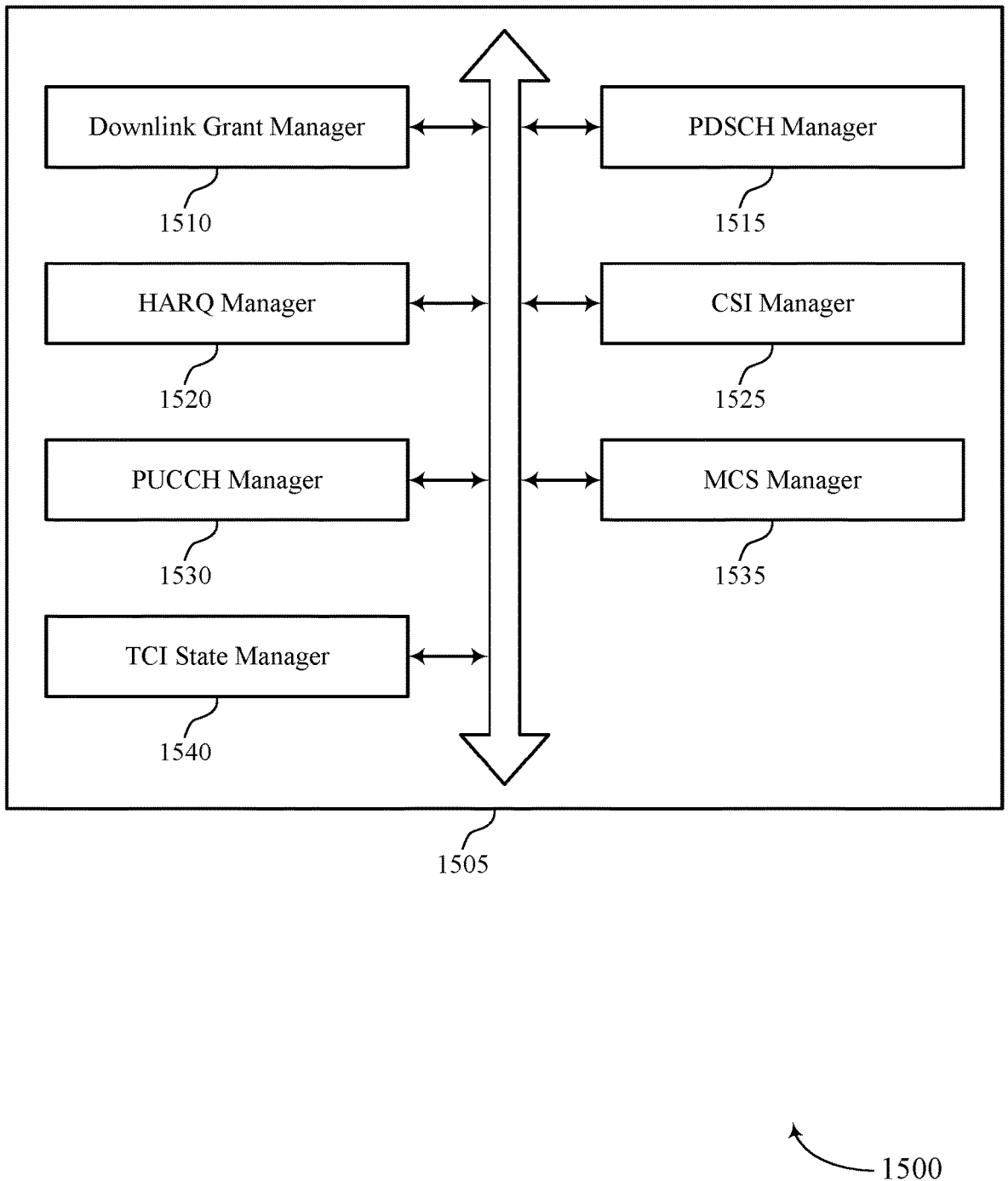
FIG. 15 shows a block diagram of a communications manager that supports two-stage feedback procedures for multiple downlink transmissions in accordance with aspects of the present disclosure.

FIG. 15 shows a block diagram 1500 of a communications manager 1505 that supports two-stage feedback procedures for multiple downlink transmissions in accordance with aspects of the present disclosure. The communications manager 1505 may be an example of aspects of a communications manager 1315, a communications manager 1415, or a communications manager 1610 described herein. The communications manager 1505 may include a downlink grant manager 1510, a PDSCH manager 1515, a HARQ manager 1520, a CSI manager 1525, a PUCCH manager 1530, a MCS manager 1535, and a TCI state manager 1540. Each of these modules may communicate, directly or indirectly, with one another (e.g., via one or more buses).

The downlink grant manager 1510 may transmit a downlink grant scheduling a set of downlink transmissions from the base station to a UE. The PDSCH manager 1515 may transmit the set of downlink transmissions based on transmitting the downlink grant. The HARQ manager 1520 may receive a first stage of feedback including at least one acknowledgment or negative acknowledgment for the set of downlink transmissions. The CSI manager 1525 may receive a second stage of feedback including at least one channel state information report or channel quality indicator for the set of downlink transmissions.

In some examples, the PDSCH manager 1515 may transmit a same transport block in accordance with a same transmission configuration indication state in the plurality of downlink transmissions. In such examples, the HARQ manager 1520 may receive the first stage of feedback comprising a single acknowledgment or negative acknowledgment for the plurality of downlink transmissions, and the CSI manager 1525 may receive the second stage of feedback comprising a single channel state information report or channel quality indicator for the plurality of downlink transmissions. The PUCCH manager 1530 may receive the first stage of feedback and the second stage of feedback for the set of downlink transmissions in a same uplink control channel.

In some examples, the PDSCH manager 1515 may transmit a same transport block in accordance with different transmission configuration indication states in the plurality of downlink transmissions. In such examples, the HARQ manager 1520 may receive the first stage of feedback comprising a single acknowledgment or negative acknowledgment for the plurality of downlink transmissions, and the CSI manager 1525 may receive the second stage of feedback comprising a channel state information report or channel quality indicator for each of the plurality of downlink transmissions. The PUCCH manager 1530 may receive the first stage of feedback for the plurality of downlink transmissions and the second stage of feedback for each of the plurality of downlink transmissions in a same uplink control channel.

In some examples, the PDSCH manager 1515 may transmit different transport blocks in accordance with a same transmission configuration indication state in the plurality of downlink transmissions. In such examples, the HARQ manager 1520 may receive the first stage of feedback comprising an acknowledgment or negative acknowledgment for each of the plurality of downlink transmissions, and the CSI manager 1525 may receive the second stage of feedback comprising a channel state information report or channel quality indicator for each of the plurality of downlink transmissions. The PUCCH manager 1530 may receive the first stage of feedback and the second stage of feedback for each of the plurality of downlink transmissions in a respective uplink control channel.

In some examples, the PDSCH manager 1515 may transmit different transport blocks in accordance with different transmission configuration indication states in the plurality of downlink transmissions. In such examples, the HARQ manager 1520 may receive the first stage of feedback comprising an acknowledgment or negative acknowledgment for each of the plurality of downlink transmissions, and the CSI manager 1525 may receive the second stage of feedback comprising a channel state information report or channel quality indicator for each of the plurality of downlink transmissions. The PUCCH manager 1530 may receive the first stage of feedback and the second stage of feedback for each of the plurality of downlink transmissions in a respective uplink control channel.

In some examples, the PDSCH manager 1515 may retransmit at least one of the set of downlink transmissions based on the first stage of feedback and the second stage of feedback. The MCS manager 1535 may determine a modulation and coding scheme or transmit power for retransmitting the at least one of the set of downlink transmissions based on the second stage of feedback. The TCI state manager 1540 may determine a transmission configuration indication state for retransmitting the at least one of the set of downlink transmissions based on the first stage of feedback, the second stage of feedback, or both. In some examples, the PDSCH manager 1515 may transmit the set of downlink transmissions in a set of slots or carriers.

Figure 16:
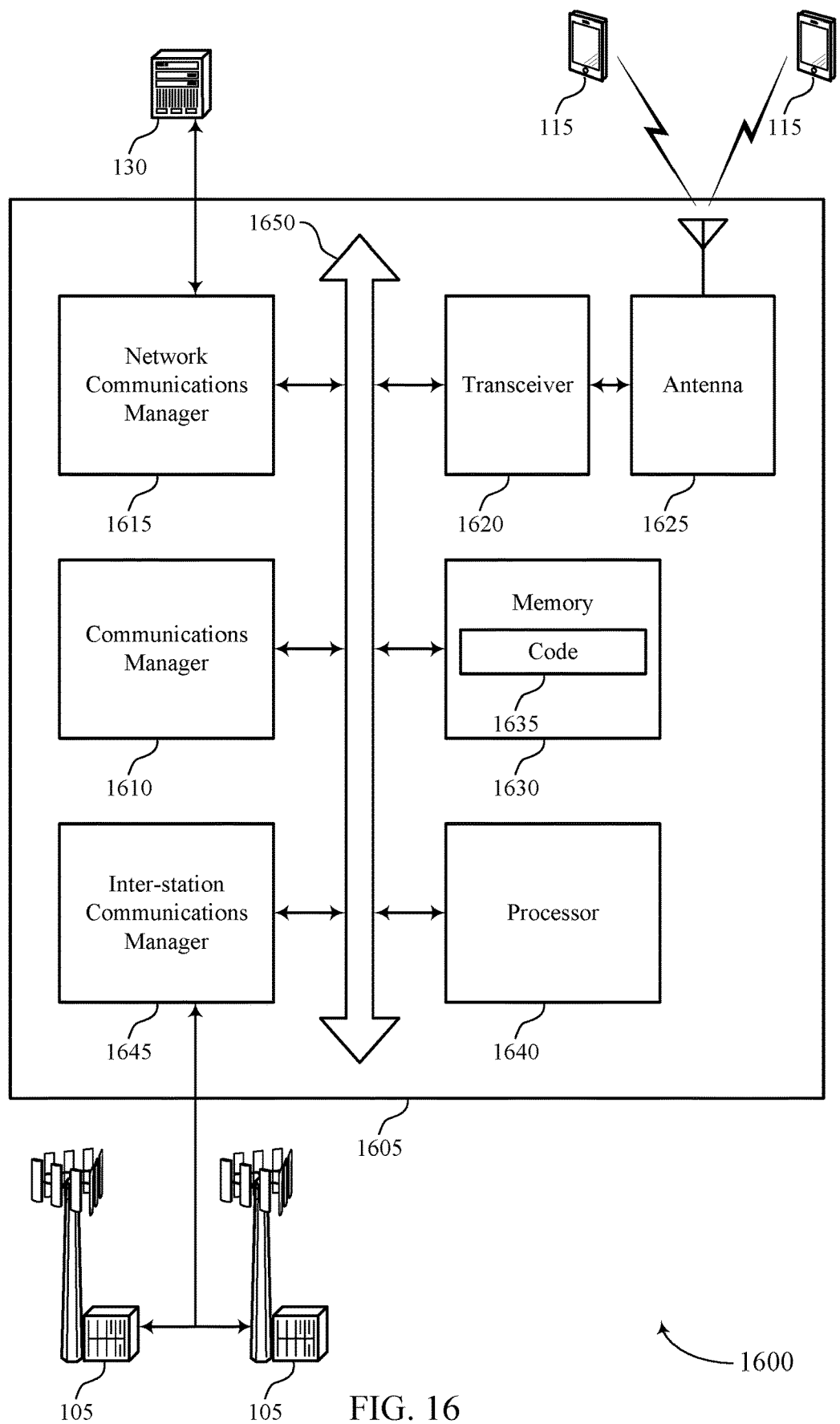
FIG. 16 shows a diagram of a system including a device that supports two-stage feedback procedures for multiple downlink transmissions in accordance with aspects of the present disclosure.

FIG. 16 shows a diagram of a system 1600 including a device 1605 that supports two-stage feedback procedures for multiple downlink transmissions in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit a downlink grant scheduling a set of downlink transmissions from the base station to a UE, transmit the set of downlink transmissions based on transmitting the downlink grant, receive a first stage of feedback including at least one acknowledgment or negative acknowledgment for the set of downlink transmissions, and receive a second stage of feedback including at least one channel state information report or channel quality indicator for the set of downlink transmissions.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting two-stage feedback procedures for multiple downlink transmissions).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
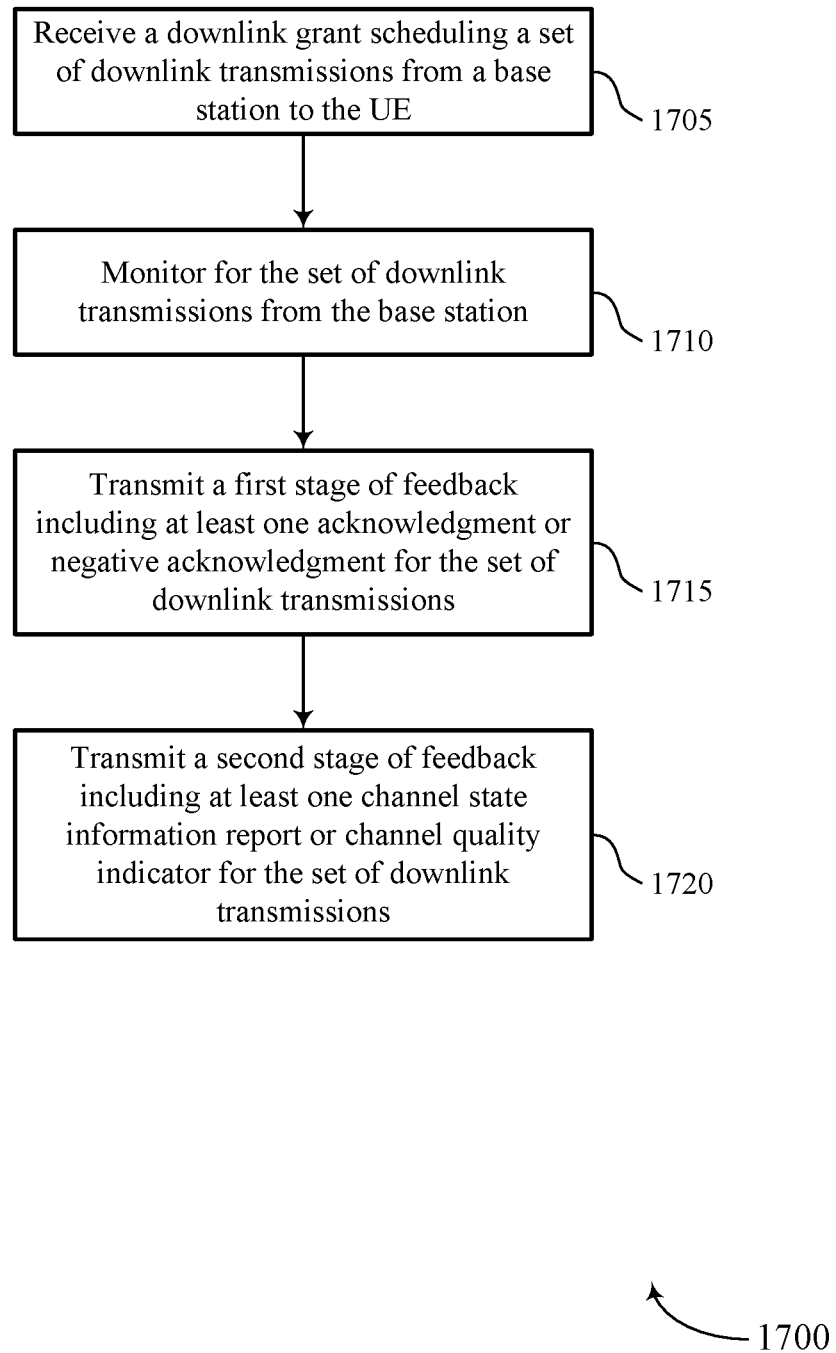
FIGS. 17 and 18 show flowcharts illustrating methods that support two-stage feedback procedures for multiple downlink transmissions in accordance with aspects of the present disclosure.

FIG. 17 shows a flowchart illustrating a method 1700 that supports two-stage feedback procedures for multiple downlink transmissions in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may receive a downlink grant scheduling a set of downlink transmissions from a base station to the UE. The operations of 1705 may be performed according to the methods described herein. In some examples, aspects of the operations of 1705 may be performed by a downlink grant manager as described with reference to FIGS. 9 through 12.

At 1710, the UE may monitor for the set of downlink transmissions from the base station. The operations of 1710 may be performed according to the methods described herein. In some examples, aspects of the operations of 1710 may be performed by a PDSCH manager as described with reference to FIGS. 9 through 12.

At 1715, the UE may transmit a first stage of feedback including at least one acknowledgment or negative acknowledgment for the set of downlink transmissions. The operations of 1715 may be performed according to the methods described herein. In some examples, aspects of the operations of 1715 may be performed by a HARQ manager as described with reference to FIGS. 9 through 12.

At 1720, the UE may transmit a second stage of feedback including at least one channel state information report or channel quality indicator for the set of downlink transmissions. The operations of 1720 may be performed according to the methods described herein. In some examples, aspects of the operations of 1720 may be performed by a CSI manager as described with reference to FIGS. 9 through 12.

Figure 18:
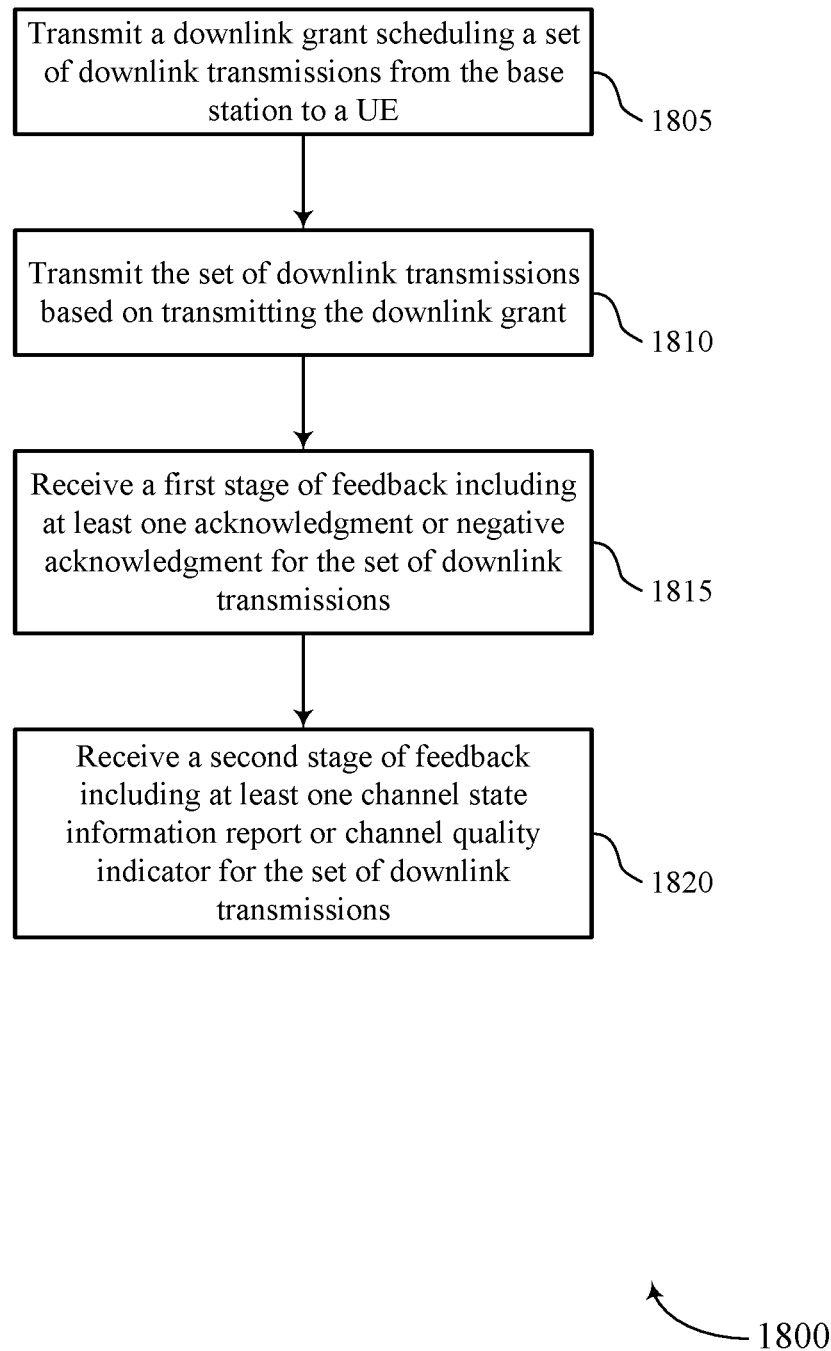

FIG. 18 shows a flowchart illustrating a method 1800 that supports two-stage feedback procedures for multiple downlink transmissions in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1805, the base station may transmit a downlink grant scheduling a set of downlink transmissions from the base station to a UE. The operations of 1805 may be performed according to the methods described herein. In some examples, aspects of the operations of 1805 may be performed by a downlink grant manager as described with reference to FIGS. 13 through 16.

At 1810, the base station may transmit the set of downlink transmissions based on transmitting the downlink grant. The operations of 1810 may be performed according to the methods described herein. In some examples, aspects of the operations of 1810 may be performed by a PDSCH manager as described with reference to FIGS. 13 through 16.

At 1815, the base station may receive a first stage of feedback including at least one acknowledgment or negative acknowledgment for the set of downlink transmissions. The operations of 1815 may be performed according to the methods described herein. In some examples, aspects of the operations of 1815 may be performed by a HARQ manager as described with reference to FIGS. 13 through 16.

At 1820, the base station may receive a second stage of feedback including at least one channel state information report or channel quality indicator for the set of downlink transmissions. The operations of 1820 may be performed according to the methods described herein. In some examples, aspects of the operations of 1820 may be performed by a CSI manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a downlink grant scheduling a set of downlink transmissions from a base station to the UE, monitoring for the set of downlink transmissions from the base station, transmitting a first stage of feedback including at least one acknowledgment or negative acknowledgment for the set of downlink transmissions, and transmitting a second stage of feedback including at least one channel state information report or channel quality indicator for the set of downlink transmissions.

Aspect 2: The method of aspect 1, wherein transmitting the first stage of feedback comprises transmitting the first stage of feedback including a single acknowledgment or negative acknowledgment for the set of downlink transmissions based on the set of downlink transmissions being associated with a same transmission configuration indication state and including a same transport block, and wherein transmitting the second stage of feedback comprises transmitting the second stage of feedback comprising a single channel state information report or channel quality indicator for the plurality of downlink transmissions based at least in part on the plurality of downlink transmissions being associated with the same transmission configuration indication state and comprising the same transport block.

Aspect 3: The method of aspects 1 and 2, wherein the first stage of feedback and the second stage of feedback for the set of downlink transmissions may be transmitted in a same uplink control channel.

Aspect 4: The method of aspect 1, wherein transmitting the first stage of feedback comprises transmitting the first stage of feedback including a single acknowledgment or negative acknowledgment for the set of downlink transmissions based on the set of downlink transmissions being associated with different transmission configuration indication states and including the same transport block, and wherein transmitting the second stage of feedback comprises transmitting the second stage of feedback comprising a channel state information report or channel quality indicator for each of the plurality of downlink transmissions based at least in part on the plurality of downlink transmissions being associated with the different transmission configuration indication states and comprising the same transport block.

Aspect 5: The method of aspect 1 and 4, wherein the first stage of feedback for the set of downlink transmissions and the second stage of feedback for each of the set of downlink transmissions may be transmitted in a same uplink control channel.

Aspect 6: The method of aspect 1, wherein transmitting the first stage of feedback comprises transmitting the first stage of feedback including an acknowledgment or negative acknowledgment for each of the set of downlink transmissions based on the set of downlink transmissions being associated with a same transmission configuration indication state and including different transport blocks, and wherein transmitting the second stage of feedback comprises transmitting the second stage of feedback comprising a channel state information report or channel quality indicator for each of the plurality of downlink transmissions based at least in part on the plurality of downlink transmissions being associated with the same transmission configuration indication state and comprising the different transport blocks.

Aspect 7: The method of aspect 1 and 6, wherein the first stage of feedback and the second stage of feedback for each of the set of downlink transmissions may be transmitted in a respective uplink control channel.

Aspect 8: The method of aspect 1, wherein transmitting the first stage of feedback comprises transmitting the first stage of feedback including an acknowledgment or negative acknowledgment for each of the set of downlink transmissions based on the set of downlink transmissions being associated with different transmission configuration indication states and including different transport blocks, and wherein transmitting the second stage of feedback comprises transmitting the second stage of feedback comprising a channel state information report or channel quality indicator for each of the plurality of downlink transmissions based at least in part on the plurality of downlink transmissions being associated with the different transmission configuration indication states and comprising the different transport blocks.

Aspect 9: The method of aspects 1 and 8, wherein the first stage of feedback and the second stage of feedback for each of the set of downlink transmissions may be transmitted in a respective uplink control channel.

Aspect 10: The method of any of aspects 1 to 9, further comprising: receiving a retransmission of at least one of the set of downlink transmissions based on transmitting the first stage of feedback and the second stage of feedback.

Aspect 11: The method of any of aspects 1 to 10, wherein a modulation and coding scheme or transmit power used for the retransmission may be based on the second stage of feedback.

Aspect 12: The method of any of aspects 1 to 11, wherein a transmission configuration indication state used for the retransmission may be based on the first stage of feedback, the second stage of feedback, or both.

Aspect 13: The method of any of aspects 1 to 12, wherein monitoring for the set of downlink transmissions comprises monitoring a set of slots or carriers for the set of downlink transmissions.

Aspect 14: The method of any of aspects 1 to 13, wherein the UE is configured to select whether to transmit the second stage of feedback based on whether the first stage of feedback comprises an acknowledgment or negative acknowledgment.

Aspect 15: A method for wireless communication at a base station, comprising: transmitting a downlink grant scheduling a set of downlink transmissions from the base station to a UE, transmitting the set of downlink transmissions based on transmitting the downlink grant, receiving a first stage of feedback including at least one acknowledgment or negative acknowledgment for the set of downlink transmissions, and receiving a second stage of feedback including at least one channel state information report or channel quality indicator for the set of downlink transmissions.

Aspect 16: The method of aspect 15, wherein transmitting the set of downlink transmissions comprises transmitting a same transport block in accordance with a same transmission configuration indication state in the set of downlink transmissions, wherein receiving the first stage of feedback comprises receiving the first stage of feedback comprising a single acknowledgment or negative acknowledgment for the plurality of downlink transmissions, and wherein receiving the second stage of feedback comprises receiving the second stage of feedback comprising a single channel state information report or channel quality indicator for the plurality of downlink transmissions.

Aspect 17: The method of aspects 15 and 16, wherein receiving the first stage of feedback and the second stage of feedback comprises receiving the first stage of feedback and the second stage of feedback for the set of downlink transmissions in a same uplink control channel.

Aspect 18: The method of aspect 15, wherein transmitting the set of downlink transmissions comprises transmitting a same transport block in accordance with different transmission configuration indication states in the set of downlink transmissions, wherein receiving the first stage of feedback comprises receiving the first stage of feedback comprising a single acknowledgment or negative acknowledgment for the plurality of downlink transmissions, and wherein receiving the second stage of feedback comprises receiving the second stage of feedback comprising a channel state information report or channel quality indicator for each of the plurality of downlink transmissions.

Aspect 19: The method of any of aspects 15 and 18, wherein receiving the first stage of feedback and the second stage of feedback comprises receiving the first stage of feedback for the set of downlink transmissions and the second stage of feedback for each of the set of downlink transmissions in a same uplink control channel.

Aspect 20: The method of aspect 15, wherein transmitting the set of downlink transmissions comprises transmitting different transport blocks in accordance with a same transmission configuration indication state in the set of downlink transmissions, wherein receiving the first stage of feedback comprises receiving the first stage of feedback comprising an acknowledgment or negative acknowledgment for each of the plurality of downlink transmissions, and wherein receiving the second stage of feedback comprises receiving the second stage of feedback comprising a channel state information report or channel quality indicator for each of the plurality of downlink transmissions.

Aspect 21: The method of aspects 15 and 20, wherein receiving the first stage of feedback and the second stage of feedback comprises receiving the first stage of feedback and the second stage of feedback for each of the set of downlink transmissions in a respective uplink control channel.

Aspect 22: The method of aspect 15, wherein transmitting the set of downlink transmissions comprises transmitting different transport blocks in accordance with different transmission configuration indication states in the set of downlink transmissions, wherein receiving the first stage of feedback comprises receiving the first stage of feedback comprising an acknowledgment or negative acknowledgment for each of the plurality of downlink transmissions, and wherein receiving the second stage of feedback comprises receiving the second stage of feedback comprising a channel state information report or channel quality indicator for each of the plurality of downlink transmissions.

Aspect 23: The method of aspects 15 and 22, wherein receiving the first stage of feedback and the second stage of feedback comprises receiving the first stage of feedback and the second stage of feedback for each of the set of downlink transmissions in a respective uplink control channel.

Aspect 24: The method of any of aspects 15 to 23, further comprising: retransmitting at least one of the set of downlink transmissions based on the first stage of feedback and the second stage of feedback.

Aspect 25: The method of any of aspects 15 to 24, further comprising: determining a modulation and coding scheme or transmit power for retransmitting the at least one of the set of downlink transmissions based on the second stage of feedback.

Aspect 26: The method of any of aspects 15 to 25, further comprising: determining a transmission configuration indication state for retransmitting the at least one of the set of downlink transmissions based on the first stage of feedback, the second stage of feedback, or both.

Aspect 27: The method of any of aspects 15 to 26, wherein transmitting the set of downlink transmissions comprises transmitting the set of downlink transmissions in a set of slots or carriers.

Aspect 28: An apparatus comprising at least one means for performing a method of any of aspects 1 to 14.

Aspect 29: An apparatus comprising at least one means for performing a method of any of aspects 15 to 27.

Aspect 30: An apparatus for wireless communications comprising a processor; memory in electronic communication with the processor; and instructions stored in the memory and executable by the processor to cause the apparatus to perform a method of any of aspects 1 to 14.

Aspect 31: An apparatus for wireless communications comprising a processor; memory in electronic communication with the processor; and instructions stored in the memory and executable by the processor to cause the apparatus to perform a method of any of aspects 15 to 27.

Aspect 32: A non-transitory computer-readable medium storing code for wireless communications, the code comprising instructions executable by a processor to perform a method of any of aspects 1 to 14.

Aspect 33: A non-transitory computer-readable medium storing code for wireless communications, the code comprising instructions executable by a processor to perform a method of any of aspects 15 to 27.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a single downlink grant that schedules a plurality of downlink transmissions from a network device to the UE;
   monitoring for the plurality of downlink transmissions from the network device;
   transmitting a first stage of feedback comprising an acknowledgment or negative acknowledgment for each of the plurality of downlink transmissions based at least in part on each of the plurality of downlink transmissions being associated with different transmission configuration indication states and comprising different transport blocks; and transmitting a second stage of feedback comprising a channel state information report or channel quality indicator for each of the plurality of downlink transmissions based at least in part on each of the plurality of downlink transmissions being associated with at the different transmission configuration indication states and comprising the different transport blocks.

2. The method of claim 1, further comprising:
receiving a second downlink grant that schedules a second plurality of downlink transmissions;
receiving the second plurality of downlink transmissions;
transmitting another first stage of feedback comprising a single acknowledgment or negative acknowledgment for the second plurality of downlink transmissions based at least in part on the second plurality of downlink transmissions being associated with a same transmission configuration indication state and comprising a same transport block; and,
transmitting another second stage of feedback comprising another channel state information report or channel quality indicator for each of the second plurality of downlink transmissions based at least in part on the second plurality of downlink transmissions being associated with the same transmission configuration indication state and comprising the same transport block.

3. The method of claim 2, wherein the first stage of feedback and the second stage of feedback for the second plurality of downlink transmissions are transmitted in a same uplink control channel.

4. The method of claim 1, further comprising:
receiving a second downlink grant that schedules a second plurality of downlink transmissions;
receiving the second plurality of downlink transmissions;
transmitting another first stage of feedback comprising a single acknowledgment or negative acknowledgment for the second plurality of downlink transmissions based at least in part on the second plurality of downlink transmissions being associated with different transmission configuration indication states and comprising a same transport block; and,
transmitting another second stage of feedback comprising another channel state information report or channel quality indicator for each of the second plurality of downlink transmissions based at least in part on the second plurality of downlink transmissions being associated with the different transmission configuration indication states and comprising the same transport block.

5. The method of claim 4, wherein the first stage of feedback for the plurality of downlink transmissions and the second stage of feedback for each of the second plurality of downlink transmissions are transmitted in a same uplink control channel.

6. The method of claim 1, further comprising:
receiving a second downlink grant that schedules a second plurality of downlink transmissions;
receiving the second plurality of downlink transmissions;
transmitting another first stage of feedback comprising another acknowledgment or negative acknowledgment for each of the second plurality of downlink transmissions based at least in part on the second plurality of downlink transmissions being associated with a same transmission configuration indication state and comprising different transport blocks; and,
transmitting another second stage of feedback comprising another channel state information report or channel quality indicator for each of the second plurality of downlink transmissions based at least in part on the second plurality of downlink transmissions being associated with the same transmission configuration indication state and comprising the different transport blocks.

7. The method of claim 6, wherein the first stage of feedback and the second stage of feedback for each of the second plurality of downlink transmissions are transmitted in a respective uplink control channel.

8. The method of claim 1, wherein the first stage of feedback and the second stage of feedback for each of the plurality of downlink transmissions are transmitted in respective uplink control channels.

9. The method of claim 1, further comprising:
receiving a retransmission of at least one of the plurality of downlink transmissions based at least in part on transmitting the first stage of feedback and the second stage of feedback.

10. The method of claim 9, wherein a modulation and coding scheme or transmit power used for the retransmission is based at least in part on the second stage of feedback.

11. The method of claim 9, wherein a transmission configuration indication state used for the retransmission is based at least in part on the first stage of feedback, the second stage of feedback, or both.

12. The method of claim 1, wherein monitoring for the plurality of downlink transmissions comprises:
monitoring a plurality of slots or carriers for the plurality of downlink transmissions.

13. The method of claim 1, wherein the UE is configured to select whether to transmit the second stage of feedback based on whether the first stage of feedback comprises an acknowledgment or negative acknowledgment.

14. A method for wireless communication at a network device, comprising:
transmitting a single downlink grant that schedules a plurality of downlink transmissions from the network device to a user equipment (UE);
transmitting the plurality of downlink transmissions based at least in part on transmitting the single downlink grant;
receiving a first stage of feedback comprising an acknowledgment or negative acknowledgment for each of the plurality of downlink transmissions based at least in part on each of the plurality of downlink transmissions being associated with different transmission configuration indication states and comprising different transport blocks; and
receiving a second stage of feedback comprising a one channel state information report or channel quality indicator for each of the plurality of downlink transmissions based at least in part on each of the plurality of downlink transmissions being associated with the different transmission configuration indication states and comprising the different transport blocks.

15. The method of claim 14, further comprising:
transmitting a second downlink grant that schedules a second plurality of downlink transmissions;
transmitting the second plurality of downlink transmissions comprising a same transport block in accordance with a same transmission configuration indication state;
receiving another first stage of feedback comprising a single acknowledgment or negative acknowledgment for the second plurality of downlink transmissions; and receiving another second stage of feedback comprising another channel state information report or channel quality indicator for each of the second plurality of downlink transmissions.

16. The method of claim 15, wherein the first stage of feedback and the second stage of feedback for the second plurality of downlink transmissions are received in a same uplink control channel.

17. The method of claim 14, further comprising:
transmitting a second downlink grant that schedules a second plurality of downlink transmissions;
transmitting the second plurality of downlink transmissions comprising a same transport block in accordance with different transmission configuration indication states;
receiving another first stage of feedback comprising a single acknowledgment or negative acknowledgment for the second plurality of downlink transmissions; and,
receiving another second stage of feedback comprising another channel state information report or channel quality indicator for each of the second plurality of downlink transmissions.

18. The method of claim 17, wherein the first stage of feedback for the second plurality of downlink transmissions and the second stage of feedback for each of the second plurality of downlink transmissions are received in a same uplink control channel.

19. The method of claim 14, further comprising:
transmitting a second downlink grant that schedules a second plurality of downlink transmissions;
transmitting the second plurality of downlink transmissions comprising different transport blocks in accordance with a same transmission configuration indication state;
receiving another first stage of feedback comprising another acknowledgment or negative acknowledgment for each of the second plurality of downlink transmissions; and,
receiving another second stage of feedback comprising another channel state information report or channel quality indicator for each of the second plurality of downlink transmissions.

20. The method of claim 19, wherein the first stage of feedback and the second stage of feedback for each of the second plurality of downlink transmissions are received in respective uplink control channels.

21. The method of claim 14, wherein the first stage of feedback and the second stage of feedback for each of the plurality of downlink transmissions are received in respective uplink control channels.

22. The method of claim 14, further comprising:
retransmitting at least one of the plurality of downlink transmissions based at least in part on the first stage of feedback and the second stage of feedback.

23. The method of claim 22, further comprising:
determining a modulation and coding scheme or transmit power for retransmitting the at least one of the plurality of downlink transmissions based at least in part on the second stage of feedback.

24. The method of claim 22, further comprising:
determining a transmission configuration indication state for retransmitting the at least one of the plurality of downlink transmissions based at least in part on the first stage of feedback, the second stage of feedback, or both.

25. The method of claim 14, wherein transmitting the plurality of downlink transmissions comprises:
transmitting the plurality of downlink transmissions in a plurality of slots or carriers.

26. An apparatus for wireless communication at a user equipment (UE), comprising:
a processor,
memory coupled with the processor; and
instructions stored in the memory and executable by the processor to cause the apparatus to:
receive a single downlink grant that schedules a plurality of downlink transmissions from a network device to the UE;
monitor for the plurality of downlink transmissions from the network device;
transmit a first stage of feedback comprising an acknowledgment or negative acknowledgment for each of the plurality of downlink transmissions based at least in part on each of the plurality of downlink transmissions being associated with different transmission configuration indication states and comprising different transport blocks; and
transmit a second stage of feedback comprising a channel state information report or channel quality indicator for each of the plurality of downlink transmissions based at least in part on each of the plurality of downlink transmissions being associated with the different transmission configuration indication states and comprising the different transport blocks.

27. The apparatus of claim 26, wherein the instructions are executable by the processor to cause the apparatus to:
receive a second downlink grant that schedules a second plurality of downlink transmissions;
receive the second plurality of downlink transmissions;
transmit another first stage of feedback comprising a single acknowledgment or negative acknowledgment for the second plurality of downlink transmissions based at least in part on the second plurality of downlink transmissions being associated with a same transmission configuration indication state and comprising a same transport block; and,
transmit another second stage of feedback comprising another single channel state information report or channel quality indicator for the second plurality of downlink transmissions based at least in part on the second plurality of downlink transmissions being associated with the same transmission configuration indication state and comprising the same transport block.

28. An apparatus for wireless communication at a network device, comprising:
a processor,
memory coupled with the processor; and
instructions stored in the memory and executable by the processor to cause the apparatus to:
transmit a single downlink grant that schedules a plurality of downlink transmissions from the network device to a user equipment (UE);
transmit the plurality of downlink transmissions based at least in part on transmitting the single downlink grant;
receive a first stage of feedback comprising an acknowledgment or negative acknowledgment for each of the plurality of downlink transmissions based at least in part on each of the plurality of downlink transmissions being associated with different transmission configuration indication states and comprising different transport blocks; and receive a second stage of feedback comprising a channel state information report or channel quality indicator for the plurality of downlink transmissions based at least in part on each of the plurality of downlink transmissions being associated with the different transmission configuration indication states and comprising the different transport blocks.

* * * * *